US008280187B1

(12) United States Patent  (10) Patent No.: US 8,280,187 B1
Avidan et al.  (45) Date of Patent: *Oct. 2, 2012

(54) SEAM CARVING AND EXPANSION OF IMAGES WITH COLOR FREQUENCY PRIORITY

(75) Inventors: Shmuel Avidan, Brookline, MA (US); Jen-Chan Chien, Saratoga, CA (US); Chintan Intwala, Santa Clara, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1015 days.

This patent is subject to a terminal disclaimer.

(21) Appl. No.: 12/184,071

(22) Filed: Jul. 31, 2008

(51) Int. Cl.
G06K 9/32 (2006.01)

(52) U.S. Cl. .................................... 382/284; 382/295

(58) Field of Classification Search ............. 382/100, 382/284, 293, 295, 300; 345/629
See application file for complete search history.

(56) References Cited

U.S. PATENT DOCUMENTS

| | | |
|---|---|---|
| 4,394,693 A | 7/1983 | Shirley |
| 5,434,414 A | 7/1995 | Berlad et al. |
| 5,438,202 A | 8/1995 | Matanson et al. |
| 5,559,901 A | 9/1996 | Lobregt |
| 5,577,179 A | 11/1996 | Blank |
| 5,587,742 A | 12/1996 | Hau et al. |
| 5,732,230 A | 3/1998 | Cullen et al. |
| 5,768,413 A | 6/1998 | Levin et al. |
| 5,790,708 A | 8/1998 | Delean |
| 5,906,005 A | 5/1999 | Niskala et al. |
| 6,157,389 A | 12/2000 | Knowlton |
| 6,195,445 B1 | 2/2001 | Dubuisson-Jolly et al. |
| 6,563,964 B1 | 5/2003 | Hallberg |
| 6,597,411 B1 * | 7/2003 | Selby et al. .................. 348/806 |
| 6,825,857 B2 | 11/2004 | Harasimiuk |
| 6,919,903 B2 | 7/2005 | Freeman et al. |
| 6,943,807 B2 | 9/2005 | Xavier |
| 6,985,641 B1 | 1/2006 | Michel et al. |
| 7,038,185 B1 | 5/2006 | Tumblin et al. |
| 7,168,038 B2 | 1/2007 | Lui et al. |
| 7,386,183 B2 | 6/2008 | Tamura |
| 7,411,628 B2 | 8/2008 | Tian et al. |

(Continued)

OTHER PUBLICATIONS

Avidan, Shai and Shamir, Ariel; "Seam carving for content-aware image resizing," ACM Transactions on Graphics (TOG) archive, vol. 26, Issue 3 (Jul. 2007), Proceedings of ACM SIGGRAPH 2007.

(Continued)

*Primary Examiner* — Stephen R Koziol
(74) *Attorney, Agent, or Firm* — Robert C. Kowert; Meyertons, Hood, Kivlin, Kowert & Goetzel, P.C.

(57) ABSTRACT

A system and method for expansion and reduction of images in an image editing application uses the frequency of pixels values (e.g., absolute color and/or intensity values) of an input image to determine respective energy values for each pixel of the image. The energy values may vary inversely with the frequency of the pixel values. The energy values may be used to determine one or more low-cost seams of the image to be removed for an image reduction operation or replicated for an image expansion operation, where the cost of each seam is dependent on the energy values of the pixels of the seam. Determining the frequency of pixel values of the image may involve determining the number of pixels having an absolute pixel value in each of a plurality of pixel value ranges, and the absolute pixel values included in each range may be configurable by the user.

36 Claims, 17 Drawing Sheets

U.S. PATENT DOCUMENTS

| | | | |
|---|---|---|---|
| 7,477,800 B2* | 1/2009 | Avidan et al. | 382/298 |
| 7,529,429 B2 | 5/2009 | Rother et al. | |
| 7,532,771 B2 | 5/2009 | Taylor et al. | |
| 7,602,398 B2* | 10/2009 | Zhou et al. | 345/582 |
| 7,747,107 B2 | 6/2010 | Avidan et al. | |
| 7,778,492 B2 | 8/2010 | Ignatchenko et al. | |
| 7,823,211 B2 | 10/2010 | Matsukawa et al. | |
| 8,023,153 B2 | 9/2011 | Bernal et al. | |
| 8,077,356 B2 | 12/2011 | Bernal et al. | |
| 2002/0006234 A1 | 1/2002 | Horiuchi | |
| 2003/0002736 A1* | 1/2003 | Maruoka et al. | 382/168 |
| 2003/0234866 A1 | 12/2003 | Cutler | |
| 2006/0017739 A1 | 1/2006 | Fang et al. | |
| 2006/0072853 A1 | 4/2006 | Clarke et al. | |
| 2006/0104542 A1 | 5/2006 | Blake et al. | |
| 2006/0177150 A1 | 8/2006 | Uyttendaele et al. | |
| 2007/0025637 A1 | 2/2007 | Setlur et al. | |
| 2007/0136685 A1 | 6/2007 | Bhatla et al. | |
| 2007/0237420 A1 | 10/2007 | Steedy et al. | |
| 2008/0095470 A1 | 4/2008 | Chao et al. | |
| 2008/0143744 A1* | 6/2008 | Agarwala | 345/629 |
| 2008/0198175 A1 | 8/2008 | Sun et al. | |
| 2008/0219587 A1* | 9/2008 | Avidan et al. | 382/276 |
| 2008/0267528 A1 | 10/2008 | Avidan et al. | |
| 2009/0033683 A1 | 2/2009 | Schiff et al. | |
| 2009/0290794 A1 | 11/2009 | Marchesotti | |
| 2009/0317010 A1* | 12/2009 | Gerhard et al. | 382/240 |
| 2010/0013827 A1 | 1/2010 | Fillion et al. | |
| 2010/0124371 A1 | 5/2010 | Jiang et al. | |
| 2010/0142853 A1 | 6/2010 | Fillion et al. | |
| 2010/0232729 A1 | 9/2010 | Peleg et al. | |
| 2010/0266208 A1 | 10/2010 | Downing et al. | |
| 2011/0200274 A1 | 8/2011 | Luo et al. | |
| 2011/0211771 A1* | 9/2011 | Rubenstein et al. | 382/299 |
| 2012/0092357 A1 | 4/2012 | Wang et al. | |

OTHER PUBLICATIONS alZahir, S., "A perceptually perfect image resizing scheme," International Conference on Consumer Electronics, 2005.. 2005 Digest of Technical Papers. Volume , Issue , Jan. 8-12, 2005 pp. 83-84.

Zomet, A., Levin, A., Peleg, S., and Weiss, Y., "Seamless image stitching by minimizing false edges," IEEE Transactions on Image Processing vol. 15, No. 4, Apr. 2006, 969-977.

Zhang , Mingju; Zhang , Lei; Sun, Yanfeng; Feng,Lin; Ma Weiying; "Auto cropping for digital photographs," IEEE International Conference on Multimedia and Expo, 2005, Publication Date: Jul. 6-8, 2005.

Andreadis, I. Amanatiadis, A.; "Digital Image Scaling," Proceedings of the IEEE Instrumentation and Measurement Technology Conference, 2005, May 16-19, 2005, vol. 3, pp. 2028-2032.

U.S. Appl. No. 12/184,019, filed Jul. 31, 2008.
U.S. Appl. No. 12/251,163, filed Oct. 14, 2008.
U.S. Appl. No. 12/183,986, filed Jul. 31, 2008.
U.S. Appl. No. 12/183,997, filed Jul. 31, 2008.
U.S. Appl. No. 12/183,974, filed Jul. 31, 2008.
U.S. Appl. No. 12/183,960, filed Jul. 31, 2008.
U.S. Appl. No. 12/183,942, filed Jul. 31, 2008.
U.S. Appl. No. 12/184,039, filed Jul. 31, 2008.
U.S. Appl. No. 12/184,060, filed Jul. 31, 2008.

Itti L et al. "A Model of Saliency-Based Visual Attention for Rapid Scene Analysis" IEEE Transactions on Pattern Analysis and Machine Intelligence, IEEE Service Center, Los Alamitos, CA, US, vol. 20, No. 11 Nov. 1, 1998, pp. 1254-1259.

Avidan S. et al.: "Seam Carving for Content-Aware Image Resizing" ACM Transactions on Graphics, ACM, US, vol. 26, No. 3, Jul. 1, 2007, pp. 10-11, XP007904203.

Agarwala et al., "Interactive digital photomontage," ACM Trans. Graph. 23, 3, 294-302, 2004. Santella et al., "Gaze-based interaction for semiautomatic photo cropping," ACM Human Factors in Computing Systems (CHI), 771-780, 2006.

Perez et al., 2003. Poisson Image Editing. SIGGRAPH'03. ACM, New York, NY, pp. 313-318.

Lui et al., "IEEE Transactions on Pattern Analysis and Machine Intelligence, vol. 30, No. 2, Feb. 2008," 16 pages.

Suh et al., 2003. Automatic thumbnail cropping and its effectiveness. UIST '03: Proceedings of the 16th annual ACM symposium on User interface software and technology, ACM Press, New York, NY, USA, pp. 95-104.

Chen et al., 2003. A visual attention model for adapting images on small displays. Multimedia Systems 9, 4, pp. 353-364.

Jacobs et al. 2003. Adaptive grid-based document layout. Proceedings of ACM SIGGRAPH, pp. 838-847.

Liu et al., 2005. Automatic image retargeting with fisheye-view warping. ACM UIST, pp. 153-162.

Setlur et al., 2005. Automatic image retargeting. Mobile and Ubiquitous Multimedia (MUM), ACM Press.

Gal et al., 2006. Feature aware texturing. Eurographics Symposium on Rendering.

Sun et al. 2005. Image completion with structure propagation. Proceedings of ACM SIGGRAPH, pp. 861-868.

Jia et al., 2006. Drag-and-drop pasting. Proceedings of SIGGRAPH, 6 pages.

Rother et al., 2006. AutoCollage. Proceedings of SIGGRAPH.

Wang et al., 2006. Simultaneous matting and compositing. Microsoft Research Technical Report, MSR-TR 2006-63 (May), 8 pages.

Zomet et al., 2006. Seamless image stitching by minimizing false edges. IEEE Transactions on Image Processing 15, 4, pp. 969-977.

Bertalmio et al., 2003. Simultaneous structure and texture image inpainting. Proceedings IEEE Conference on Computer Vision and Pattern Recognition, 13 pages.

Drori et al. 2003. Fragment-based image completion. Proceedings of ACM SIGGRAPH, pp. 303-312.

Criminisi et al., 2003. Object removal by exemplar-based inpainting. IEEE Conference on Computer Vision and Pattern Recognition, pp. 417-424.

Rubinstein, et al., "Improved Seam Carving for Video Retargeting," ACM Transactions on Graphics, vol. 27, No. 3, Art. 16, Aug. 2008, pp. 16-1 to 16-10.

Wang, et al. "Optimized Scale-and-Stretch for Image Resizing," ACM Transactions on Graphics, vol. 27, No. 5, Art. 118, Dec. 2008, pp. 118-1 to 118-8.

U.S. Appl. No. 12/200,637, filed Aug. 28, 2008, Adobe Systems Incorporated, all pages.

U.S. Appl. No. 12/250,406, filed Oct. 31, 2008, Adobe Systems Incorporated, all pages.

U.S. Appl. No. 12/251,163, filed Oct. 14, 2008, Adobe Systems Incorporated, all pages.

U.S. Appl. No. 12/469,486, filed May 20, 2009, Adobe Systems Incorporated, all pages.

U.S. Appl. No. 12/469,508, filed May 20, 2009, Adobe Systems Incorporated, all pages.

U.S. Appl. No. 12/551,178, filed Aug. 31, 2009, Adobe Systems Incorporated, all pages.

Jacob Stultz, "Seam Carving: Parallelizing a Novel New Image Resizing Algorithm," May 16, 2008, all pages, http://beowulf.lcs.mit.edu/18.337-2008/projects/reportz/stultz-6338.pdf.

Santella et al., 2006. Gaze-based interaction for semiautomatic photo cropping. ACM Human Factors in Computing Systems (CHI), pp. 771-780.

Michael J. Jones, James M. Rehg., "Statistical Color Models with Application to Skin Detection," International Journal of Computer Vision, 46, 1, Jan. 2002, pp. 81-96.

Jacob Stultz, Seam Carving: Parallizing a Novel New Image Resizing Algorithm, May 16, 2008, all pages.

Vladimir Vezhnevets, Vassili Sazonov and Alla Andreeva, "A Survey on Pixel-Based Skin Color Detection Techniques," Proc. Graphicon—2003, pp. 85-92, Moscow, Russia, Sep. 2003.

* cited by examiner

SEAM CARVING AND EXPANSION OF IMAGES WITH COLOR FREQUENCY PRIORITY

BACKGROUND

Description of the Related Art

The diversity and versatility of display devices today imposes new demands on digital media. For instance, designers must create different alternatives for web-content and design different layouts for different devices. Moreover, HTML, as well as other standards, can support dynamic changes of page layout and text. Images, although they make up some of the key elements in digital media, typically remain rigid in size and cannot deform to fit different layouts automatically. However, the size and/or aspect ratio of an image must change in order to fit into different displays, such as cell phones or PDAs, or to print on a given paper size or at a specified resolution.

Resizing images using standard image scaling is often not sufficient since it is oblivious to the image content and typically can be applied only uniformly, resulting in various artifacts or distortions of the input image. Cropping is also of limited use since it can only remove pixels from the image periphery. More effective resizing can only be achieved by considering the image content and not only geometric constraints. Seam carving techniques have been developed which alter the dimensions of an image by removing pixels from the image or adding pixels to the image that are considered to be less important than other pixels of the image, e.g., based on a pixel's value as compared to the value of its neighbors. However, standard seam carving techniques may be computationally expensive and may also produce undesirable artifacts or distortions.

SUMMARY

Various embodiments of systems, methods, and computer-readable storage media for expansion and reduction of images may use the frequency of pixels values (e.g., absolute color values and/or absolute intensity values) of an input image to determine a respective energy value for each pixel of the image. In some embodiments, the respective energy values of each of the pixels of the image may vary inversely with the determined frequency of the pixel values. In other words, if a given color or range of colors is used abundantly in the image, pixels associated with that color or color range may be assigned lower energy values than pixels associated with less frequently used colors and/or color ranges. In some embodiments, such a method may be used to protect pixels having colors (or colors in a color range) that are rarely used in the image during an image reduction operation (e.g., using seam carving) and/or to identify lower-priority pixels and/or seams to be replicated during an image expansion operation. This may, in turn, serve to preserve image content during such resizing operations.

In some embodiments, determining the frequency of pixel values of the image may involve determining the number of pixels having an absolute pixel value in each of a plurality of pixel value ranges (i.e., in different "buckets"). In such embodiments, the absolute pixel values included in each of the buckets may be configurable by the user. In some embodiments, determining the respective energy values of each pixel may be further dependent on one or more of: a difference between two or more pixel values, a derivative of two or more pixel values, an average of two or more pixel values, a maximum of two or more pixel values, and a minimum of two or more pixel values.

The energy values associated with the pixels of an input image may in some embodiments be used to determine a cost associated with various seams of the image, where a seam represents a monotonic path from one edge of the image to the opposite edge of the image. The cost of each seam may be dependent on the energy values of all the pixels of the seam, or on a maximum energy value for the pixels of the seam, and may represent the priority of the seam in the image. In some embodiments, one or more low-cost seams (e.g., those having the lowest priority in the image) may be identified for removal (e.g., for an image reduction operation) or for replication (e.g., for an image expansion operation) to produce a resized image. For example, in an image reduction operation, all of the pixels of an identified low-cost seam may be removed from the image. Similarly, in an image expansion operation, all of the pixels of an identified low-cost seam may be replicated and the replicated copy may be inserted into the image (e.g., adjacent to the identified seam). Multiple seams may be removed and/or replicated to achieve a target size and/or ratio for the resized image.

The methods described herein may be implemented as program instructions, (e.g., stored on computer-readable storage media) executable by a CPU and/or GPU, in various embodiments. For example, they may be implemented as program instructions that, when executed, implement a resizing operation in an image editing application in response to user input.

Figure 1A:
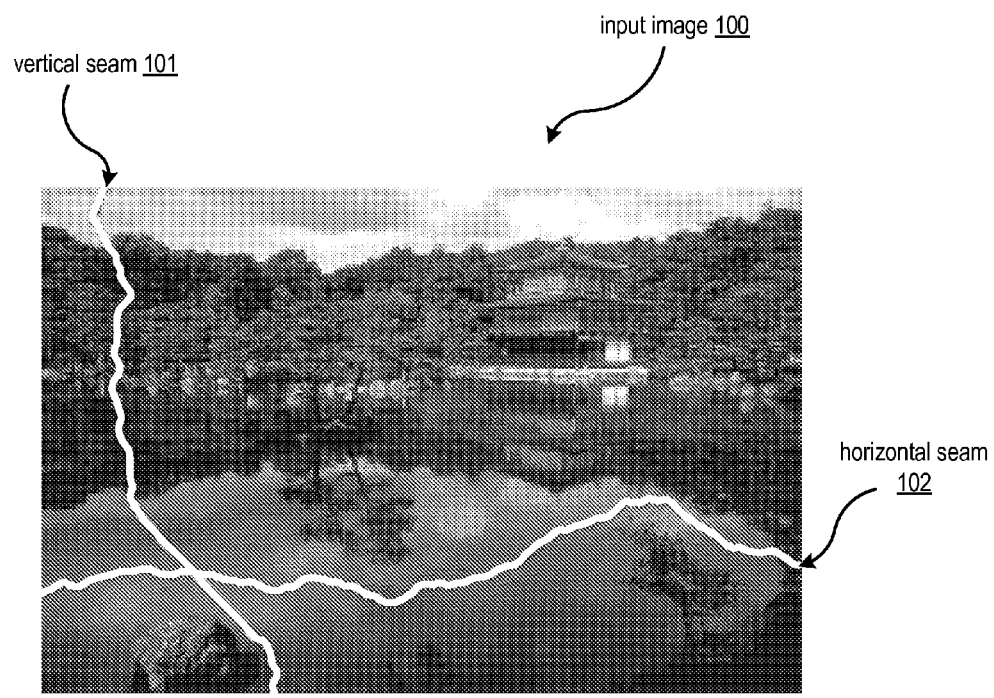
FIG. 1A illustrates two seams of an input image to be resized, according to one embodiment.

While several embodiments and illustrative drawings are included herein, those skilled in the art will recognize that embodiments are not limited to the embodiments or drawings described. It should be understood, that the drawings and detailed description thereto are not intended to limit embodiments to the particular forms disclosed, but on the contrary, the intention is to cover all modifications, equivalents and alternatives falling within the spirit and scope as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Graphic applications include an ever-increasing number of image editing features, such as various filtering options and resizing operations (e.g., for cropping, expanding, or reducing an image). Currently available image resizing techniques include scaling techniques and seam-based techniques, also known as seam carving techniques. Seam carving, as described herein, may be used to increase or decrease the size of an image, in various embodiments. For example, given an image, to reduce the width, one or more seams in the image may be identified by a seam carving technique and removed from the image, while to increase the width one or more seams may be identified and replicated in the image. As used herein, the term "seam" refers to a set of pixels along a path from one edge of the image (e.g., the top of the image) to the opposite edge of the image (e.g., the bottom of the image) that satisfies the following two constraints:

1) The seam is monotonic, meaning (in this example) that its path only goes in one direction across the image (e.g., down), and does not reverse directions as it crosses the image (e.g., going down for a while and then up, or vice versa).
2) The seam comprises pixels that are "connected" to each other. In other words, for any given pixel of the seam (in this example), the pixel on the next row must be either directly below the given pixel or diagonally adjacent to the given pixel (e.g., one pixel to the left of the pixel or one pixel to the right of the given pixel on the next row). For example, from any given pixel of the seam to the next pixel of the seam, the path cannot jump to a pixel 20 pixels away in the next row.

In various embodiments, seam carving techniques may be content sensitive, or context aware. For example, given an input image, the data representing the image may be processed to generate an alternate representation of the image, which may be referred to as an energy map, which indicates the importance of each pixel in terms of image resizing. In some embodiments of a content-aware seam carving technique, the values mapped to each pixel of the input image by this energy map may be generated dependent on the pixels in its neighborhood, e.g., using a derivative function. For, example, if a white pixel is surrounded by other white pixels, it may not be considered an important pixel (with respect to a resizing operation). This is because if it is removed, it is not likely to be missed. On the other hand, if a white pixel is surrounded by black pixels, then removing it may be very noticeable and may change the content of the image. Therefore, this pixel may be mapped to a higher value by the energy map.

A content-aware seam carving technique may in various embodiments assign an energy or weight to every pixel, and may use those values to identify one or more seams having a minimal cost with respect to a resizing operation. In other words, the content-aware seam carving technique may use the energy costs of each pixel to identify a path of pixels going from one edge of the image to the opposite edge of the image for which the sum of the energy values has the minimum value. In some embodiments, this determination may be solved efficiently using a technique called dynamic programming or shortest path. Once the lowest-cost seam has been identified, the image may be resized along the seam. For example, if the resizing operation is a reduction operation, the pixels associated with the lowest-cost seam may be removed. In this example, the seam carving operation would remove one pixel per row (because the seam is monotonic), and all the pixels to the right of the seam would be moved one pixel to the left to obtain an image that is one pixel narrower than the input image. By iteratively applying this technique, the image may be reduced to reach a target size and/or aspect ratio. Similarly, if the resizing operation is an expansion operation, the pixels associated with the lowest-cost seam may be replicated, and a copy of each pixel may be inserted into the image to the right of the seam. In this example, the seam carving operation would add one pixel per row, and all the pixels to the right of the seam would be moved one pixel to the right to obtain an image that is one pixel wider than the input image. By iteratively applying this technique, the image may be expanded to reach a target size and/or aspect ratio. Note that in other embodiments, rather than iteratively calculating the lowest-cost seam and duplicating it (e.g., one seam at a time) during an expansion operation, the cost of all seams may be computed up front, and then one or more of the lowest-cost seams may be duplicated until the resizing target is met. In some embodiments, the energy values for the pixels of the image and/or the lowest-cost seam may be recalculated after each iteration (e.g., after the removal or replication of a single seam). In other embodiments, the energy values may be recalculated only after the image has been resized to its target size and/or aspect ratio, or may not be recalculated at all.

Figure 1B:
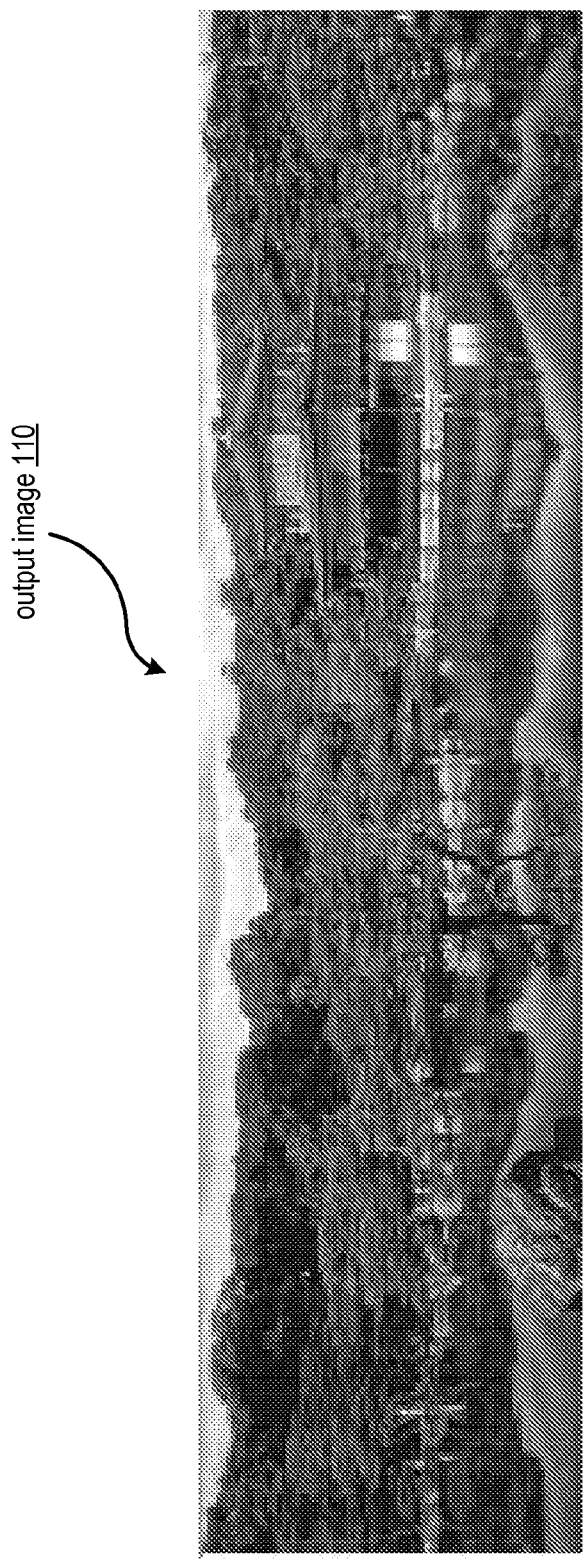
FIG. 1B illustrates an output image after resizing, according to one embodiment.

Seam carving may be further illustrated by way of example in FIGS. 1A and 1B. FIG. 1A illustrates an input image 100, which is to be resized. In this example FIG. 1A is to be resized to a target size with an aspect ratio that is shorter (i.e., smaller in the vertical dimension) and wider (i.e., longer in the horizontal dimension) than input image 100. In this example, seam carving techniques may be applied twice, once in each dimension.

To expand the width of input image 100, one or more low-cost (or lowest-cost) seams of pixels going from top to bottom, such as vertical seam 101, are identified. Input image 100 is then expanded by replicating the pixels of each of the identified vertical seams (e.g., by making a copy of each pixel of the seam and inserting it into the image to the right of the seam). This may produce a resized image as an intermediate result, in some embodiments. To reduce the height of the input image, one or more low-cost (or lowest-cost) horizontal seams, such as horizontal seam 102, are identified. The resized input image 100 may then be reduced by removing the pixels of the identified horizontal seams. An output image 110, resulting from these two resizing operations, is illustrated in FIG. 1B. Note that in other embodiments, the reduction operation may be performed before the expansion operation, the reduction and expansion operations may be performed in parallel, or the resizing operation may alternate between the replication of seams (e.g., one at a time) and the removal of seams (e.g., one at a time) until the target size and/or aspect ratio for the output image is reached.

Figure 2:
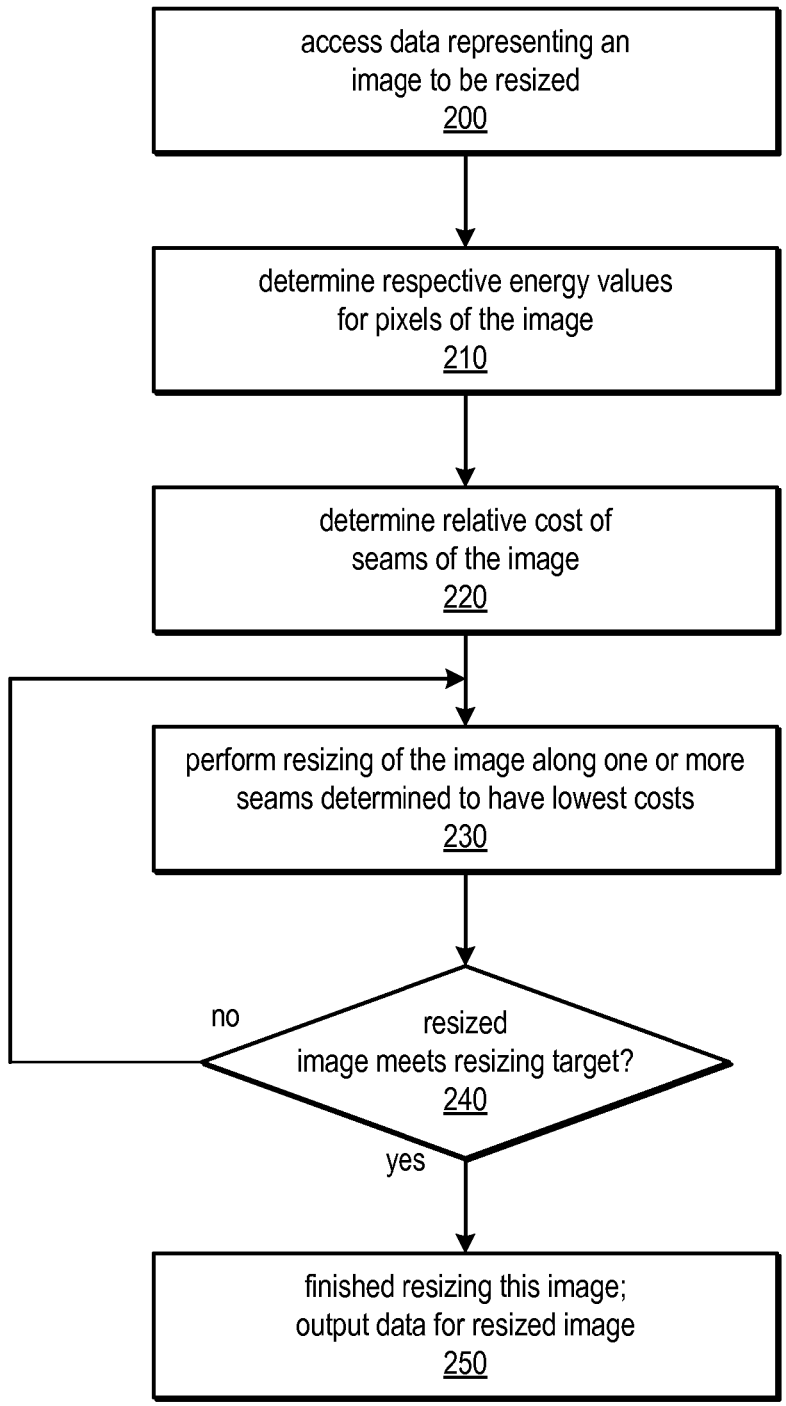
FIG. 2 is a flow chart illustrating a method for resizing images along seams, according to various embodiments.

One method for seam carving is illustrated by the flow chart in FIG. 2. In this example, data representing an image to be resized is accessed, as in 200. This data may be accessed in response to being imported into an application configured for image editing, or may be resident in memory accessible to such an application as a result of being imported previously, or as a result of being created and/or modified by the application prior to the desired resizing operation. Note that, as used herein, the term "image editing application" may refer to a graphic application that is specifically directed to image editing, or to any application that includes an image editing component, according to various embodiments. The data accessed may represent a whole image or a portion of an image that is to be resized, in different embodiments. For example, in one embodiment, a user may select a portion of an image on which to perform a resizing operation using a selecting tool or a cropping tool of an image editing application. The user may also select a target size, expansion/reduction target (e.g., a percentage increase or decrease in one or more dimensions) and/or target aspect ratio for a resizing operation using various user interface elements (e.g., pull-down menus, radio buttons, or alphanumeric input fields), in various embodiments.

In this example, respective energy values may be determined for each of the pixels of image, as in 210. The energy values may be determined as described above (e.g., using a derivative function or another parametric function), or by any of various other methods, including those described in detail below. Dependent on these energy values, the relative cost of various seams of the image may be determined, as in 220. For example, in some embodiments, a cost may be computed for all possible seams of the image, or for the lowest possible seam for each edge pixel of the image, while in other embodiments, the data representing the image may be processed so that only a portion of the seams (e.g., the lowest-cost seams up to a given number or percentage of these seams) may be identified and their costs computed. Note that the cost of each seam may be determined in various ways in different embodiments, such as by calculating a sum, average, or weighted average of the energy values of the pixels making up the seam. In another example, the cost of each seam may be dependent on a maximum energy value for the pixels of the seam. In other words, a seam may be assigned a higher cost due to the presence of even one high-energy pixel in the seam, because removing that pixel may create an undesirable visual artifact.

In the example illustrated in FIG. 2, the method may include resizing the image along one or more of the seams determined to have the lowest costs, as in 230. As described above, if the image is to be reduced, the pixels of an identified low-cost seam (e.g., the lowest-cost seam) may be removed, while if the image is to be expanded, the pixels of an identified low-cost seam (e.g., the lowest-cost seam) may be replicated and inserted adjacent to the identified seam. Additional or alternate actions that may be taken as part of a resizing operation are described in detail below.

If the resizing operation performed in 230 does not result in a resized image that meets its resizing target (e.g., a target for size, percentage increase/decrease, and/or aspect ratio), shown as the negative exit from 240, additional resizing operations (e.g., on each successive next lowest cost seam) may be performed on the image. This is shown as the feedback from 240 to 230. If the resizing operation performed in 230 results in a resized image that meets its resizing target, shown as the positive exit from 240, the method may output data representing the resized image, as in 250. For example, the data may be provided to a display component of the application for display of the resized image to the user and/or the data may be stored as in intermediate image by the image editing application for further processing by the application (or another application) or as a final image (e.g., written to main memory, a file, an archive, etc.). Note that the method illustrated in FIG. 2 may in various embodiments be applied to reduction of an image, expansion of an image, or a combination of reduction and expansion operations in order to resize the image to its target size and/or aspect ratio (as in FIGS. 1A-1B).

In some embodiments, a look-up table, rather than a parametric function, may be used to define an arbitrary mapping of image data to energy values. These energy values may then used to determine seams to be removed (for seam carving) or replicated (for image expansion). The look-up table may be used to apply a cap on the energy value, in some embodiments. The look-up table may also provide a mechanism for reconfiguring seam carving thresholds, as described in more detail below.

As described above, a current seam carving algorithm may determine the energy of each pixel as the sum of the absolute gradient for each pixel. In other words, the energy of each pixel may be computed as a derivative of its neighbors, i.e., as a local energy function of the pixels adjacent to it. This energy function may define a linear relationship between the difference in intensity values of a pixel and its neighbors and the importance (or energy) of the pixel. For example, for a given pixel, if the difference between the intensity values of the pixels on its left and right is 17, the energy of the given pixel may be mapped to a value of 17.

In some embodiments, the determination of the energy of each pixel may be generalized using a look-up table. In the example above, let g=abs(dx)+abs(dy) represent the gradient magnitude of a given pixel. Using a parametric energy function, the energy may be set as E=g. However, in embodiments that include a look-up table, the energy may instead be set as E=T(g), where T is the look-up table. Using a look-up table, each intensity difference (i.e., gradient) may in some embodiments be mapped to an energy value that does not have a linear relationship. This may be well suited for image editing applications, because the human visual system has different sensitivities. For example, if the gradient around a pixel in intensity is between 0 and 255, it may not matter to a human viewer (i.e., it may not be noticeable) if the gradient is 150 versus 175. However, the human view may be sensitive to whether the gradient is 20 versus 30. Therefore, if there is a weak edge, it may be captured (i.e., identified and mapped as being of a high priority with respect to resizing operations). If it is a strong edge, may not really matter how strong it is (e.g., 100, 200, or 255). Therefore, in some embodiments, a look-up table may be used to decouple the gradient (and/or the actual intensity values) from the energy.

In one example, a look-up table may be used to define a mapping in which E=g for some pixel values (or, in this case gradient values), but the energy value may be capped to a specified maximum. One example of such a look-up table may be defined as follows:

T(0)=0, . . . T(50)=50, T(51)=50, . . . , T(255)=50

In this example, the look-up table may not favor one strong edge (e.g., an edge whose pixels have a gradient greater than 50) over another, because the energy value is capped at 50 for all gradient values of 50 or higher. Such a cap may be suitable for determining seam priorities for image resizing because although the human visual system is sensitive to edges, once an edge is "strong enough," it may not matter how strong it is. An energy value cap, such as that described above, may in some embodiments be used to protect all such edges that are "strong enough" from being affected by a seam carving operation.

Figure 3:
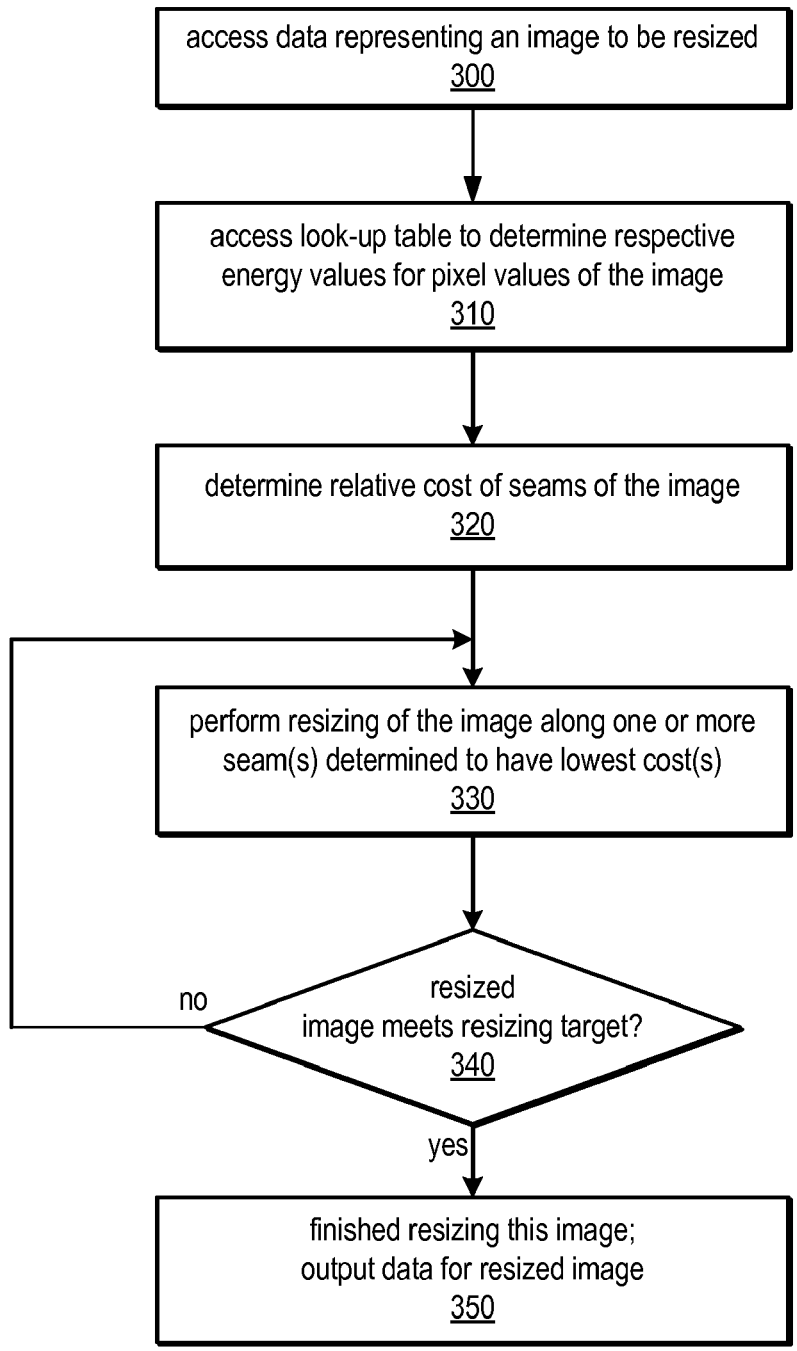
FIG. 3 is a flow chart illustrating a method for determining seams according to a table look-up, according to one embodiment.

One embodiment of a method for using a table to map energy values to pixels is illustrated by the flow chart in FIG. 3. In this example, as in the method illustrated in FIG. 2, the method may include accessing data representing an image to be resized, as in 300. In this example, the method includes accessing a look-up table to determine the mappings between pixel values and energy values, as in 310. As described herein, the inputs (or indices) to such a look-up table may be the values of the pixels of the image themselves, in some embodiments. In other embodiments, the inputs/indices to the table may be derived values, dependent on those pixel values. For example, the input/index values may represent an average, maximum, or minimum of the pixel values for a group of neighboring pixels, or may represent the sum or difference of pixel values for neighboring pixels. In still other embodiments, each entry in the table may correspond to a range of pixel values or a range of derived values based on pixel values. For example, all pixel having a value below a specified minimum value (e.g., less than 5), or all pixels having values in a range of 6-10, 11-15, 16-20, and so on, may be mapped to the same energy value. In still other embodiments, a look-up table may be used to define any arbitrary mapping function between pixel values (or derived values) and energy values, and may include a cap, or threshold on pixel values (or derived values) above which a maximum or other default energy value may be mapped. In some embodiments, a look-up table may be used to define a mapping that applies a curve function to the energy values mapped therein. In various embodiments, such a function may be configurable by a user directly, or may be configurable through a user interface of an image editing application (e.g., a filtering tool, a curve adjustment tool, or a threshold adjustment tool).

In the example illustrated in FIG. 3, the method may continue much as the method illustrated in FIG. 2. It may include determining the relative costs of one or more seams of the image (as in 320) dependent on the determined energy values, performing resizing of the image along one or more seam(s) determined to be of lowest cost (as in 330), and performing additional resizing operations (e.g., on each successive next lowest cost seam) if the resizing target for the image is not met (as in 340 and the feedback to 330). Once the image has been resized to the target size, shown as the positive exit from 340, data representing the resized image may be output, as in 350. The resized image may be displayed to the user and/or the output data may be stored for further processing or for other purposes, as described above. Note that, as in the example illustrated in FIG. 2, the method illustrated in FIG. 3 may in various embodiments be applied to reduction of an image, expansion of an image, or a combination of reduction and expansion operations in order to resize the image to its target size and/or aspect ratio (as in FIGS. 1A-1B).

In the example, above, a look-up table is used to cap the energy values associated with an image. For example, if the intensity gradient is higher that a given threshold, it may be mapped to the capped energy value. In other embodiments, a graphic application may be configured to de-emphasize weak edges and emphasize strong edges, instead, or to apply any other arbitrary emphasis. In such embodiments, a configurable look-up table may be used, and may be modified for different applications and/or within an application for different effects (e.g., as selected or defined by the user). For example, instead of a linear relationship, a cubic or quadratic polynomial may be used to parametrically determine a gradient (or energy value), but this may limit the ability to introduce non-linearities, caps, and/or sharp discontinuities in the values. However, such non-linearities, caps, or discontinuities may in some embodiments be introduced using a look-up table. In another example, an entropy measure may be used to determine energy values. For example, for a 7×7 window around a pixel, the entropy of the intensity values in the window may be computed to define the importance of the pixel. Again, this may in some embodiments be implemented using a look-up table, which may allow the introduction of non-linearities, caps, and/or discontinuities.

The methods for seam carving described above may not be dependent on the absolute value (e.g., intensity or color) of a pixel, but only its relative value with respect to its neighbors. For example, such seam carving techniques may not distinguish between a seam going through a solid red region or a solid black region. However, in other embodiments, seam carving techniques may be dependent on color. In some such embodiments, the absolute value of pixel data (e.g., the color and/or intensity value), rather than a relative value (e.g., an intensity gradient) may be used to determine the energy value of each pixel. For example, a given color or range of colors may be assigned a higher energy value. This may in some embodiments be used to protect pixels having a particular color or color range during seam carving and/or to identify pixels to be replicated for image expansion. This technique may be used in conjunction with an automated skin tone detector, or in conjunction with a user interface that allows selection of one or more high priority colors or color ranges, in various embodiments.

Figure 4A:
FIG. 4A illustrates an input image including skin tones.

In one example, a resizing operation (e.g., a reduction operation) may be performed on the input image shown in FIG. 4A, which depicts a child and a snowman. Traditional seam carving, e.g., using a gradient function, may remove one or more horizontal seams having low-cost values (according to a gradient function applied to the pixels of those seams), resulting in the image shown in 4B. In this example, traditional seam carving may produce a resized image with undesirable results, even though the operation may have removed pixels that were determined to be "less important" (e.g., due to the presence of similar pixels nearby). In other embodiments, rather than treating all pixel values as equally important, an alternate method for seam carving may treat the pixel values corresponding to particular colors or color ranges (e.g., skin tones) as being more important than the values of other pixels. In other words, even if the intensities (or gradients) of the pixels of a given seam are low relative to those of other seams, it may be undesirable to remove the seam. Instead, the energy values (i.e., the importance) of these pixels may be weighted so that they are higher than they would be if they were based solely on the gradient (e.g., on the values of other pixels the neighborhood). Such a method may produce a resized image such as that shown in FIG. 4C. In this example, the pixels making up the face of the child were protected from removal by being more heavily weighted than those of other elements depicted in the image.

In this example, the value of pixels that correspond to skin tone colors may be weighted so that a low-cost seam is less likely to pass through a region that includes these skin tones. Increasing the weight of the pixels may in one embodiment be implemented as follows: Let D(p) denote the distance of the pixel color from some canonical skin color (e.g., in some color space such as RGB or Lab). In this example, a weight mask may be created as follows: W(p)=exp(−D(p)/v), where W(p) is the weight of pixel p and v is a sigma value to control the width of the Gaussian. In this example, the closer the pixel value is to a skin tone color, the higher the weight that is assigned it.

Figure 4B:
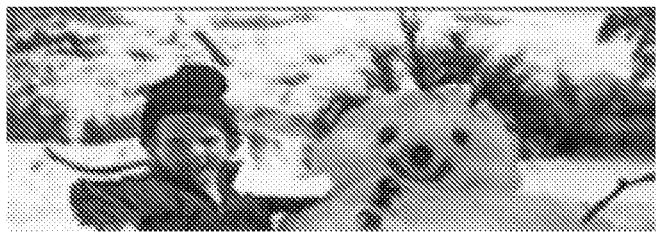
FIGS. 4B-4C illustrate output images including skin tones following resizing, according to different embodiments.
Figure 4C:
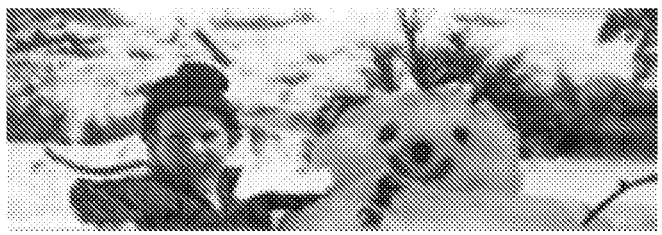

One embodiment of a method for weighting specific pixel values or ranges of pixel values when mapping energy values to pixels is illustrated by the flow chart in FIG. 4. In this example, as in the method illustrated in FIG. 2, the method may include accessing data representing an image to be resized, as in 500. In this example, the method includes applying a weighting function to pixel values representing one or more user-specified or pre-determined colors or color ranges (e.g., skin tones, or other color(s) to be "protected"), as in 310. Note that in some embodiments, protection of skin tones may be automatic or may be automatic if a corresponding feature of the image editing application is enabled or selected by the user. In other embodiments, a user may select one or more colors or color ranges to be protected from seam-based resizing operations by identifying them through a user interface of an image editing application (e.g., using a selection tool, pull-down menu, radio button, or alphanumeric input field). The energy values for the pixels of the image may then be determined (e.g., using a mapping function, look-up table, or other mechanisms) dependent on the weighting applied to the selected color or colors, as in 520. As described in previous examples, the energy values may be determined based on derived values of these weighted pixel colors (e.g., an average, maximum, sum or difference of the weighted values of a pixel and its neighbors), in some embodiments.

Figure 5:
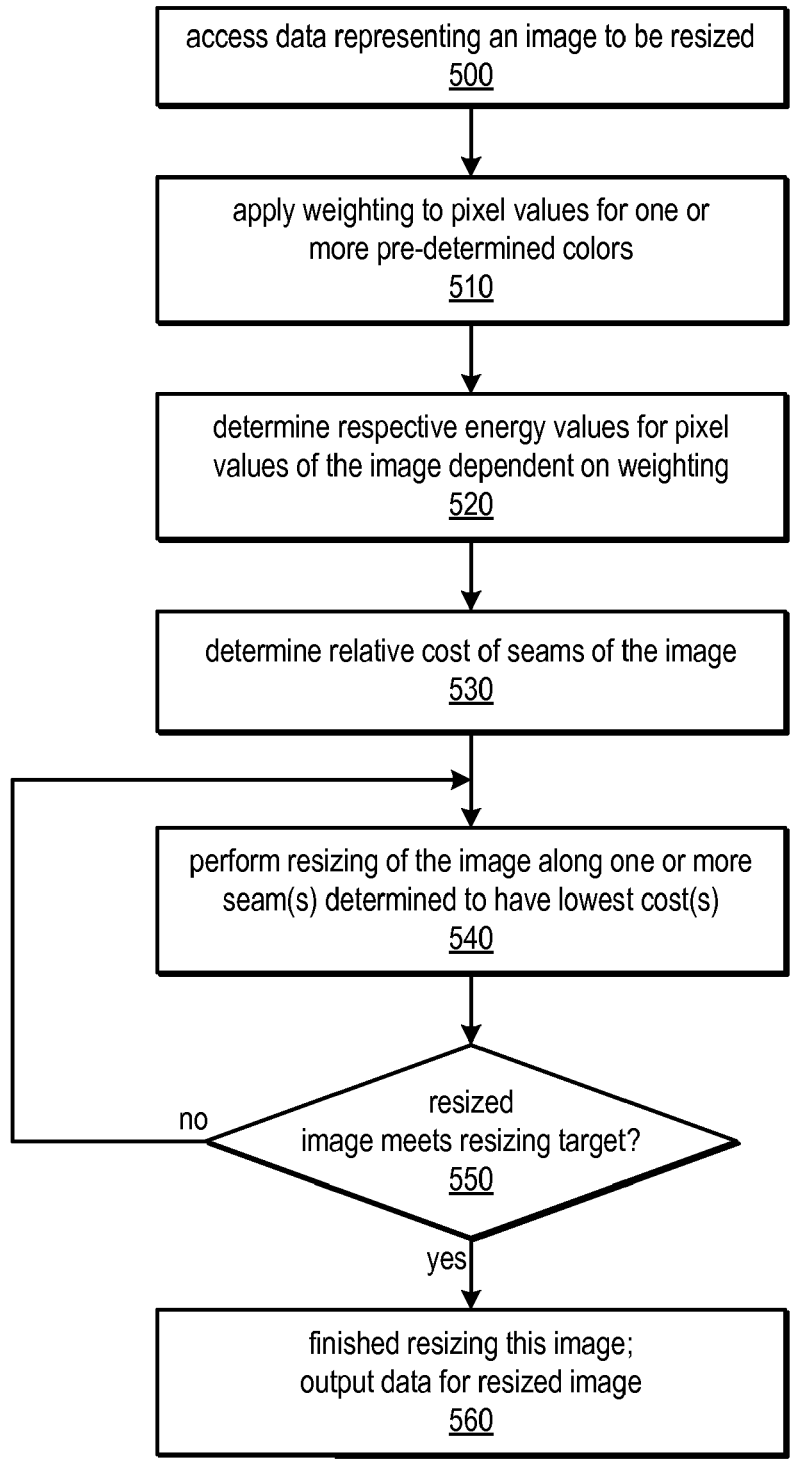
FIG. 5 is a flow chart illustrating a method for determining seams dependent on pixel color weighting, according to one embodiment.

In the example illustrated in FIG. 5, the method may continue much as the method illustrated in FIG. 2. It may include determining the relative costs of one or more seams of the image (as in 530) dependent on the determined energy values, performing resizing of the image along one or more seam(s) determined to be of lowest cost (as in 540), and performing additional resizing operations (e.g., on each successive next lowest cost seam) if the resizing target for the image is not met (as in 550 and the feedback to 540). Once the image has been resized to the target size, shown as the positive exit from 550, data representing the resized image may be output, as in 560. The resized image may be displayed to the user and/or the output data may be stored for further processing or for other purposes, as described above. Note that, as in the example illustrated in FIG. 2, the method illustrated in FIG. 5 may in various embodiments be applied to reduction of an image, expansion of an image, or a combination of reduction and expansion operations in order to resize the image to its target size and/or aspect ratio (as in FIGS. 1A-1B).

While several of the examples above involve the protection of skin tones, the method may be more generally applicable to protecting any given color or range/family of colors by adding bias to the energy function to assign a higher energy to the color or colors within a given delta of that color. For example, a user may choose to emphasize the blues or greens of an input image, rather than skin tones. In various embodiments, a mask may be created to bias the energy function, or a tool in the application may be used to select a portion of the image (e.g., an object or color) to identify pixels of a color that should be protected. For example, a quick selection tool or color selection tool may be used to specify one or more colors to be protected, or an image editing application may include an explicit "color range" command, in various embodiments.

An alternative content-aware seam carving technique may use the frequency of different pixel values to determine priorities for image resizing. For example, in some embodiments, a histogram of the absolute values of pixel data (e.g., color and/or intensity values), rather than a relative value (e.g., an intensity gradient), may be used to determine the energy value of each pixel. For example, a pixel having a color that is rare in the image or that is in a range of colors that is rare in the image may be assigned a higher energy value than pixels having colors that are widely used in the image. In other words, the respective energy values of the pixels may vary inversely with the frequency of their pixel values. This technique may in some embodiments be used to protect pixels having sparsely used colors during seam removal and/or to identify widely used pixels to be removed or replicated during image expansion. For example, if an image includes two candidate seams having the same total energy value, one of which passes through a red region and the other of which passes through a blue region, standard seam carving techniques may have no way of preferring one over the other. However, in one embodiment, a histogram of the data representing the image may be created and may be used to determine that there are very few red pixels. In this example, it may be preferable to keep the red pixels (which are rarer) and to choose the seam passing through the blue region as the target of the resizing operation.

In various embodiments, such a histogram may be expressed as an array of buckets whose values are dependent on the values of pixels in a given region of an image. For example, the value of each bucket may correspond to a count of the number of pixels in a source population (i.e. a region of pixels) that have a given value or range of values. In some such embodiments, there may be a linear mapping between a bucket index and the pixel value being counted. In the case of 8 bit images, for example, pixel values from 0 to 255 may map to a bucket index having corresponding values from 0 and 255. In some embodiments, a scatter operation may be used to generate a histogram (i.e., to "fill" the buckets of the histogram according to the pixel values of the pixels in a region of interest). For example, for a rectangular source region from $(i_0, j_0)$ to $(i_n, j_m)$, a scatter operation $S(i_0, i_n, j_0, j_m)$ may be defined using the following pseudo-code example:

For i from $i_0$ to $i_n$
{
For each j from $j_0$ to $j_m$
{
  H[I(i, j)]+=1
}
}

Figure 6A:
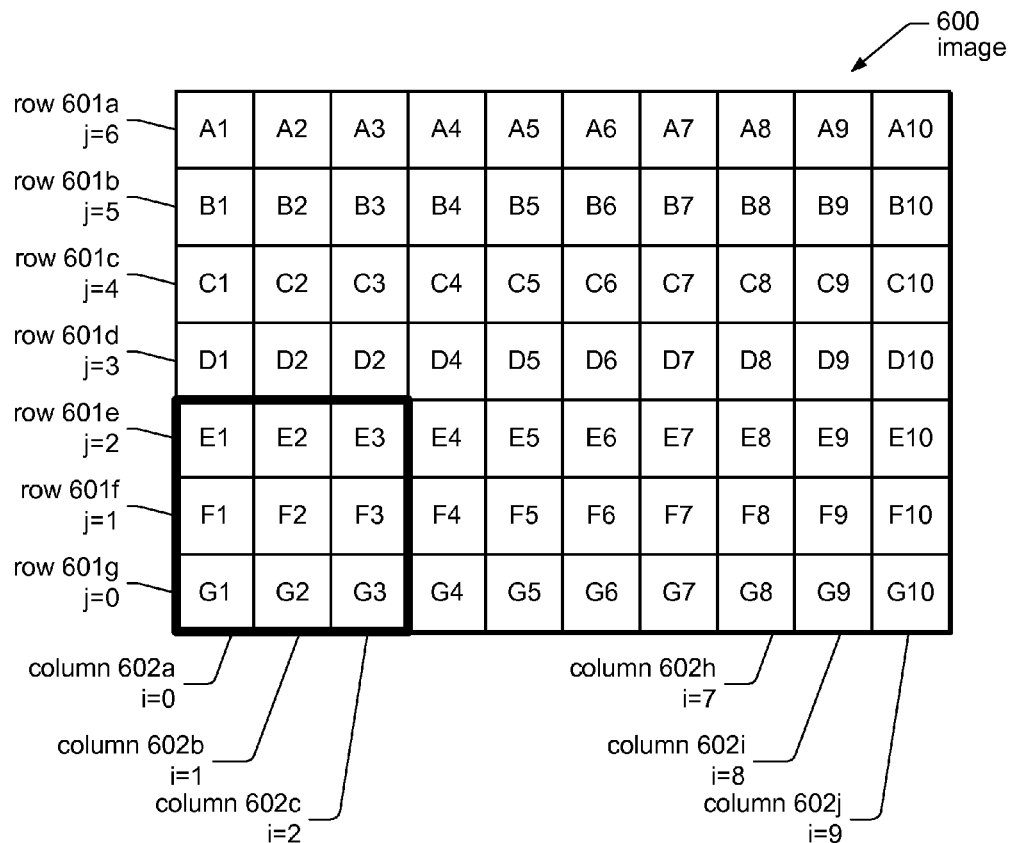
FIG. 6A illustrates a representation of the pixels of an input image, according to one embodiment.
Figure 6B:
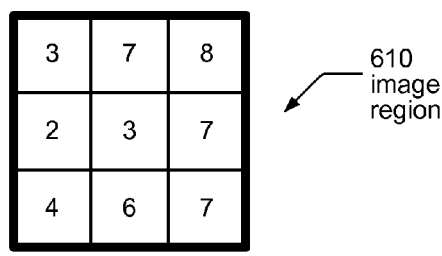
FIG. 6B illustrates a representation of the pixel values of a portion of an input image, according to one embodiment.

In other words, for each pixel in the region, the scatter operation would increment the bucket value corresponding to the value of that pixel. FIG. 6A illustrates a source image 600 that includes seven rows 601 of ten pixels each, that includes a region of interest 610, comprising pixels E1, F1, G1, E2, F2, G2, E3, F3, G3 in columns 602a-602c and rows 601e-601g. This region of interest may be a region of an image to be resized, in some embodiments, and may be used in this example to further explain the use of histograms in seam-based resizing operations. In this example, the values of these pixels (e.g., the values representing a color and/or intensity of these pixels in input image 600) are as illustrated in image region 610, shown in FIG. 6B. In this example, the value of pixel G1 is 4, the value of pixel F1 is 2, the value of pixel E1 is 3, and so on.

In this example, a histogram of image 600 may in some embodiments include 256 buckets corresponding to 8-bit color values ranging from 0-255, where each bucket may be indexed by a corresponding index value. Each bucket value may correspond to a count of the number of pixels having the same value as the index value. Note that in other embodiments, column and/or region histograms may have values corresponding to a sum of weights or a weighted count of pixels, or may be dependent on pixel values in another way. In this example, the bucket having index 0 may be used to count the number of pixels in the region having the color value 0, the bucket having index 1 may be used to count the number of pixels in the region having the color value 1, and so on. In this example, a histogram for image region 610 may include a bucket2 having a value of 2 (since only one pixel has the value 2), a bucket3 having a value of 2 (since two pixels have a value of 2), a bucket4 having a value of 1, a bucket6 having a value of 1, a bucket7 having a value of 3, a bucket8 having a value of 1, and all other buckets having indexes between 0-255 (other than those listed) having a value of 0 (since no pixels in the region have those values). In this example, the values of the histogram array are illustrated in the following table:

TABLE 1

Example histogram array

| | |
|---|---|
| Bucket0 | 0 |
| Bucket1 | 0 |
| Bucket2 | 1 |
| Bucket3 | 2 |
| Bucket4 | 1 |
| Bucket5 | 0 |
| Bucket6 | 1 |
| Bucket7 | 3 |
| Bucket8 | 1 |
| Bucket9 | 0 |
| . . . | 0 |
| Bucket254 | 0 |
| Bucket255 | 0 |

In another embodiment, a histogram may represent the normalized frequency of the pixel values of an image. For example, in one embodiment, if H denotes a normalized histogram of the image, and $C(p)$ denotes the color value of pixel p, then $H(C(p))$ may denote the percentage of pixels in the image with color value $C(p)$. The weight of the pixel may then be set to $W(p)=1/(H(C(p))+c)$, where c is a predefined constant that guards against division by zero. In this example, the fewer pixels an image includes of a particular color, the more important each of those pixels becomes. For example, if an image has very few white pixels, then even if there is a cluster of white pixels, the energy function of a particular white pixel may be very low (based on the histogram) even though it is surrounded by other white pixels. In this way, the region containing the white pixels may be protected.

Figure 7:
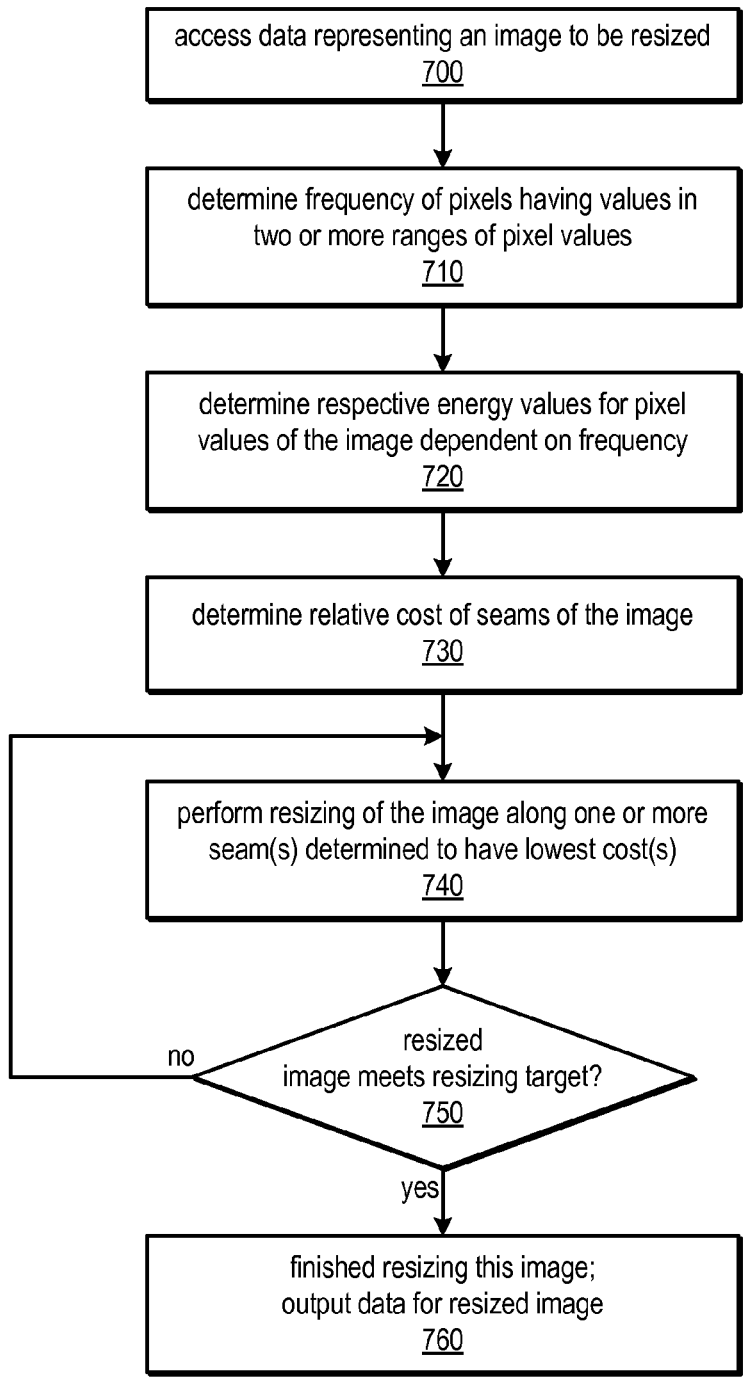
FIG. 7 is a flow chart illustrating a method for determining seams dependent on pixel value frequency, according to one embodiment.

One embodiment of a method for weighting rarely used pixel values or ranges of pixel values when mapping energy values to pixels is illustrated by the flow chart in FIG. 7. In this example, as in the method illustrated in FIG. 2, the method may include accessing data representing an image to be resized, as in 700. In this example, the method includes determining a frequency of pixel values representing two or more colors or color ranges, as in 710. For example, the method may include generating a histogram that indicates a count of pixels in the image having a given pixel value, as described above, or that includes a count of pixels having a pixel value in a given range (e.g., one bucket for pixel values 0-15, another for pixel values 16-31, and so on, or one bucket for pixel values representing various shade of red, another for various shades of blue, and so on). The pixel values or the range of pixel values assigned to each bucket may in some embodiments be configurable by the user (e.g., through a user interface of an image editing application), as may the granularity of bucket value assignments and/or the number of buckets into which values are grouped. The energy values for the pixels of the image may then be determined dependent on the frequency of the pixel values in the image, as in 720. Note that in some embodiments, this frequency-weighting technique may be used in conjunction with other weighting techniques. For example, in one embodiment, this technique may be used together with a skin tone protection technique, as described above, to protect both skin tones (whether or not they are rarely used) and one or more rarely used colors or color ranges in the image.

In the example illustrated in FIG. 7, the method may continue much as the method illustrated in FIG. 2. It may include determining the relative costs of one or more seams of the image (as in 730) dependent on the determined energy values, performing resizing of the image along one or more seam(s) determined to be of lowest cost (as in 740), and performing additional resizing operations (e.g., on each successive next lowest cost seam) if the resizing target for the image is not met (as in 750 and the feedback to 740). Once the image has been resized to the target size, shown as the positive exit from 750, data representing the resized image may be output, as in 760. The resized image may be displayed to the user and/or the output data may be stored for further processing or for other purposes, as described above. Note that, as in the example illustrated in FIG. 2, the method illustrated in FIG. 7 may in various embodiments be applied to reduction of an image, expansion of an image, or a combination of reduction and expansion operations in order to resize the image to its target size and/or aspect ratio (as in FIGS. 1A-1B).

As described above, seam carving (e.g., seam-based reduction or expansion of an image) is a discrete operation. In other words, any given pixel may be removed from the image, replicated, or kept, in an all-or-nothing operation. However, in other embodiments, such seam-based techniques may be combined with scaling techniques, as a hybrid resizing operation. A hybrid resizing technique may use a combination of seam carving and standard image scaling techniques to reduce or expand an image. In one embodiment, seam carving techniques may be used to remove or add one or more low-cost seams, as described herein. If the target size and/or aspect ratio for the input image is not reached by removing or adding these seams, the hybrid technique may use a scaling technique to further reduce or expand the image to achieve the new target size and/or aspect ratio.

Figure 8:
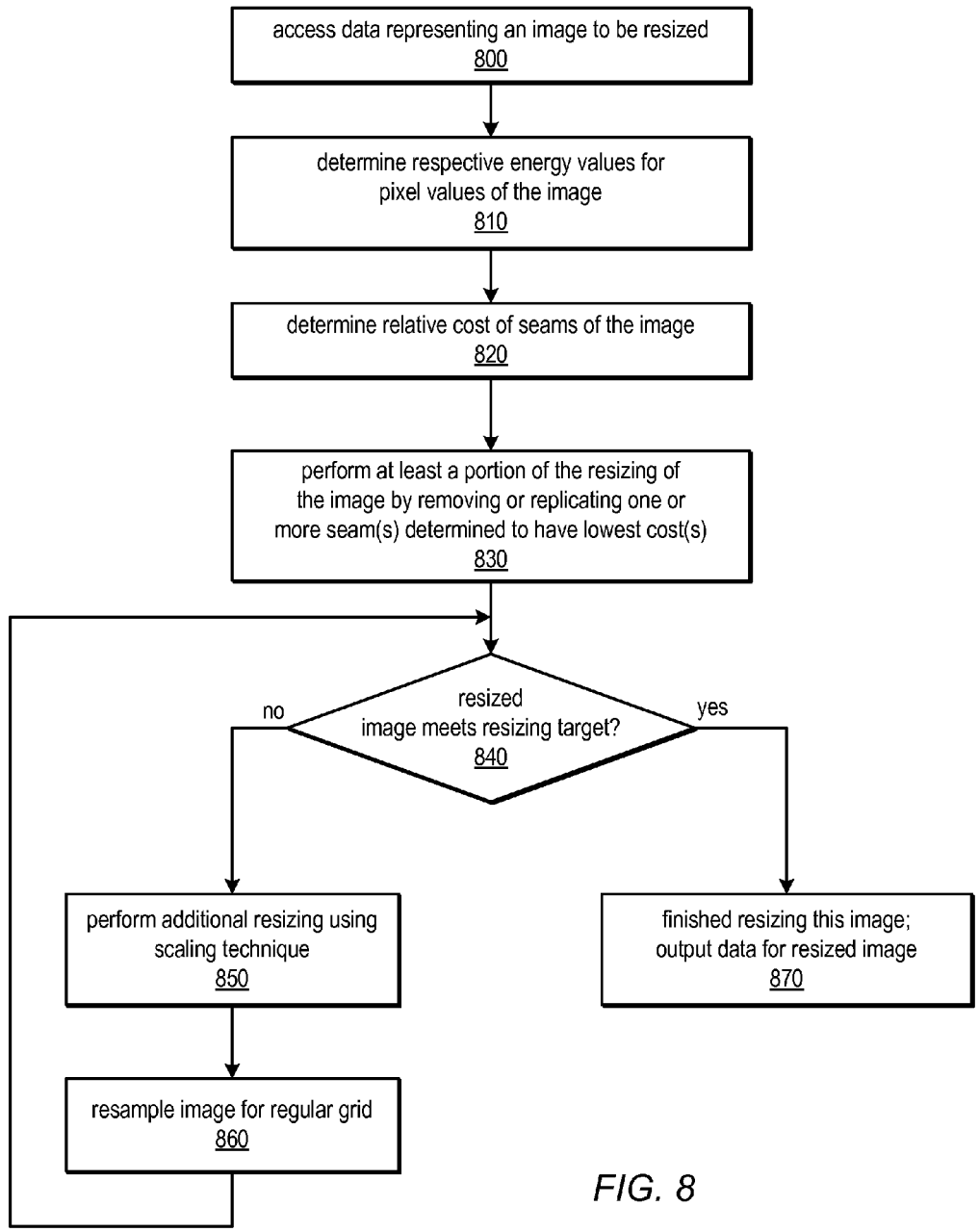
FIG. 8 is a flow chart illustrating a hybrid method for resizing images along seams and/or using scaling techniques, according to one embodiment.

FIG. 8 illustrates a hybrid method for image resizing, according to one embodiment. In this example, as in several of the previous examples, the method may include accessing data representing an image to be resized, as in 800. In this example, the method includes determining energy values for the pixel values of the image, as in 810. These energy values may be determined using any of the methods described herein, or another method, in various embodiments. The method may include determining the relative costs of one or more seams of the image (as in 820) dependent on the determined energy values, again, using any suitable method for determining seam cost, including those described herein.

In the example illustrated in FIG. 8, the method includes performing at least a portion of the desired resizing of the image using seam-based reduction and/or expansion operations, as described herein. For example, pixels of one or more low-cost seams may be removed from the image and/or pixels of one or more low-cost seams may be replicated in the image, in different embodiments (e.g., beginning with the lowest cost seam and continuing with one or more next lowest cost seams in succession). If the resizing target for the image is not met using these seam-based techniques, shown as the negative exit from 840, the method may include performing additional resizing using one or more scaling techniques, as in 850. In some embodiments, after applying a scaling technique to the image, the scaled image may be re-sampled to realign the pixels of the image to a regular grid, as in 860. In other embodiments, the image may not be re-sampled after a scaling operation, or the image may be re-sampled only after the resizing target has been met, e.g., after two or more scaling operations have been applied to the image (not shown). Such re-sampling is described in more detail below.

In this example, additional scaling operations may be applied to the image if the scaling applied at 850 is not sufficient to achieve the target size and/or aspect ratio for the resizing operation. This is shown as the feedback loop from 860 to 840. Once the image has been resized to the target size, shown as the positive exit from 840, data representing the resized image may be output, as in 870. The resized image may be displayed to the user and/or the output data may be stored for further processing or for other purposes, as described above. Note that, as in the example illustrated in FIG. 2, the method illustrated in FIG. 8 may in various embodiments be applied to reduction of an image, expansion of an image, or a combination of reduction and expansion operations in order to resize the image to its target size and/or aspect ratio (as in FIGS. 1A-1B).

In one example, if the width of an image is to be reduced by 50 pixels, each time a seam is removed from the image, the average energy along the seam may be determined. In this example, the user may be able to specify a threshold for the cost of removing a seam (e.g., through a user interface of an image editing application). If the cost (i.e., the total energy) of a candidate seam is above the threshold, removing the seam might introduce visual artifacts into the image. In this case, the hybrid technique may switch to a scaling technique (e.g., a standard image scaling technique or a custom scaling technique) to complete the resizing operation. In some embodiments, the method may be configured to discover (automatically) when the seams targeted for removal (or replication, in an expansion operation) are above the threshold and to automatically switch to a scaling technique. In the example above, only 20 pixels may be removed using seam carving and the remaining 30 pixels of image reduction may be achieved by rescaling the image to fit the smaller size footprint.

Figure 9:
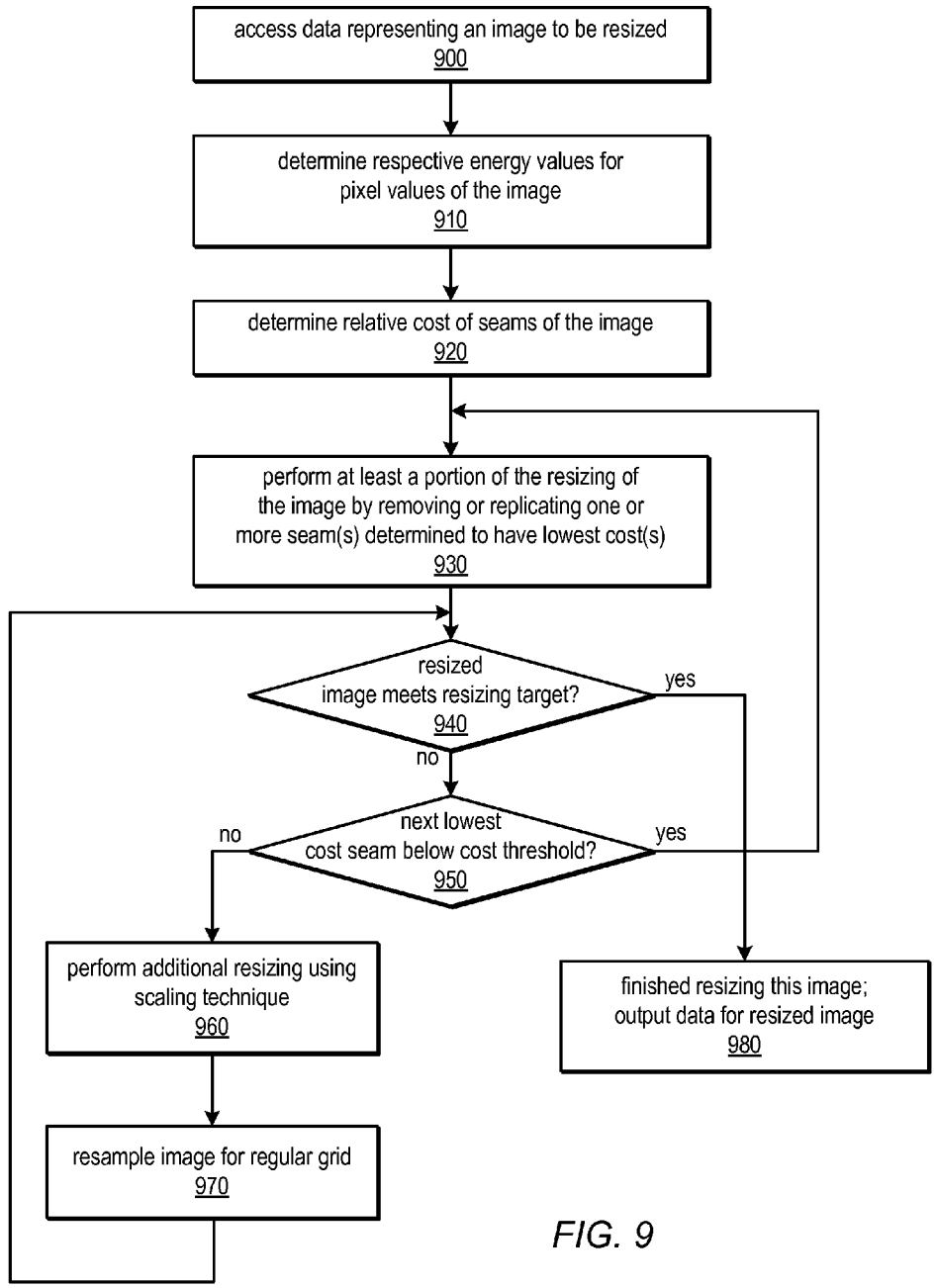
FIG. 9 is a flow chart illustrating a hybrid method for resizing images along seams and/or using scaling techniques dependent on a seam cost threshold, according to one embodiment.

FIG. 9 illustrates a hybrid method for image resizing, according to one embodiment. In this example, as in several of the previous examples, the method may include accessing data representing an image to be resized, as in 900. In this example, the method includes determining energy values for the pixel values of the image, as in 910. These energy values may be determined using any of the methods described herein, or another method, in various embodiments. The method may include determining the relative costs of one or more seams of the image (as in 920) dependent on the determined energy values, again, using any suitable method for determining seam cost, including those described herein.

In the example illustrated in FIG. 9, the method includes performing at least a portion of the desired resizing of the image using seam-based reduction and/or expansion operations, as described herein. For example, pixels of one or more low-cost seams may be removed from the image and/or pixels of one or more low-cost seams may be replicated in the image, in different embodiments (e.g., beginning with the lowest cost seam and continuing with one or more next lowest cost seams in succession). If the resizing target for the image is not met using these seam-based techniques, shown as the negative exit from 940, and if a predetermined cost threshold above which a seam may not be removed or replicated has not been reached, shown as the positive exit from 950, additional seam-based operations may be performed on the image. This is shown as the feedback loop from 950 to 930. For example, in one embodiment, the method may only remove and/or replicate very low-cost seams, i.e., those having costs up to a predetermined cost threshold. Seams having a cost higher than this threshold may not be removed or replicated. If the resizing target is met by removing and/or replicating one or more lowest-cost seams, shown as the positive exit from 940, the resizing operation is complete, and data representing the resized image may be output, as in 980.

In this example, after all the seams having costs below the cost threshold have been removed (for a reduction operation) or replicated (for an expansion operation), if the resizing target has not been met, the method may include performing additional resizing using one or more scaling techniques. This is shown as the negative output from block 950, and by block 960. As described above, any of a number of scaling techniques may be applied to further reduce or expand the image. In some embodiments, after applying a scaling technique to the image, the scaled image may be re-sampled to realign the pixels of the image to a regular grid, as in 970. In other embodiments, the image may not be re-sampled after a scaling operation, or the image may be re-sampled only after the resizing target has been met, e.g., after two or more scaling operations have been applied to the image (not shown). Such re-sampling is described in more detail below.

In this example, additional scaling operations may be applied to the image if the scaling applied at 960 is not sufficient to achieve the target size and/or aspect ratio for the resizing operation. This is shown as the feedback loop from 970 to 940. Once the image has been resized to the target size, shown as the positive exit from 940, data representing the resized image may be output, as in 980. The resized image may be displayed to the user and/or the output data may be stored for further processing or for other purposes, as described above. Note that, as in the example illustrated in FIG. 2, the method illustrated in FIG. 9 may in various embodiments be applied to reduction of an image, expansion of an image, or a combination of reduction and expansion operations in order to resize the image to its target size and/or aspect ratio (as in FIGS. 1A-1B).

Another embodiment of a hybrid resizing technique may also use a combination of seam carving and standard image scaling techniques to reduce or expand an image. However, in this embodiment, seam carving techniques may be used to remove or add seams according to a configurable tolerance for seam carving. For example, if the tolerance is set to 60%, the method may use seam carving techniques to identify low energy seams, and to remove or replicate them to achieve 60% of the desired scaling. The hybrid method may then apply a scaling technique (e.g., a standard image scaling technique or a custom scaling technique) to further reduce or expand the image to achieve the target size and/or aspect ratio.

Figure 10:
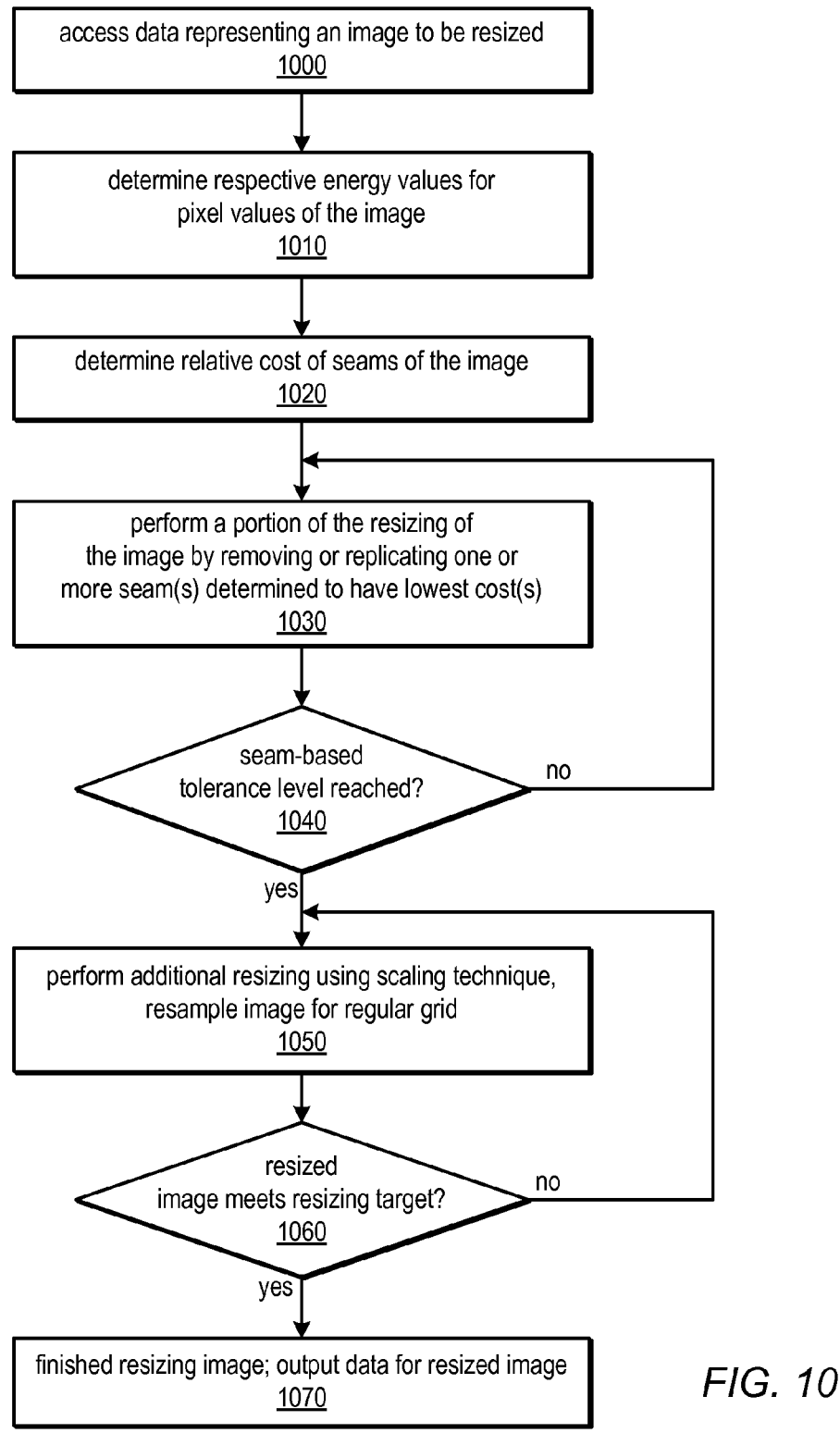
FIG. 10 is a flow chart illustrating a hybrid method for resizing images along seams and/or using scaling techniques dependent on a seam count or seam percentage threshold, according to one embodiment.

FIG. 10 illustrates a hybrid method for image resizing, according to one embodiment. In this example, as in the previous examples, the method may include accessing data representing an image to be resized, as in 1000. In this example, the method includes determining energy values for the pixel values of the image, as in 1010. These energy values may be determined using any of the methods described herein, or another method, in various embodiments. The method may include determining the relative costs of one or more seams of the image (as in 1020) dependent on the determined energy values, again, using any suitable method for determining seam cost, including those described herein.

In the example illustrated in FIG. 10, the method includes performing a portion of the desired resizing of the image using seam-based reduction and/or expansion operations, as described herein. For example, pixels of one or more low-cost seams (e.g., the lowest cost seam) may be removed from the image and/or pixels of one or more low-cost seams may be replicated in the image, in different embodiments.

If a predetermined tolerance level for seam-based image resizing has not been reached, shown as the negative exit from 1040, additional seam-based operations may be performed on the image (e.g., along one or more next lowest cost seams in succession). This is shown as the feedback loop from 1040 to 1030. For example, in one embodiment, the method may only remove and/or replicate a predetermined number or percentage of the lowest-cost seams, or may only remove or replicate the number of low-cost seams needed to achieve a specified percentage of the targeted resizing. For example, the user may be able to specify a tolerance level for seam-based resizing as a percentage of the overall resizing operation, e.g., specifying that only 60% of a horizontal and/or vertical resizing may be the result of seam removal or replication, and the remaining resizing must be achieved using other methods, such as scaling. In another embodiment, the user may be able to specify a seam carving tolerance as a percentage of the number of horizontal and/or vertical seams in the image (e.g., specifying that no more than 20% of the vertical seams should be removed in a given resizing operation). In yet another embodiment, the user may be able to specify a seam carving tolerance as a maximum number of seams that may be removed or replicated in a given resizing operation (e.g., no more than 25 seams).

In this example, once the tolerance level for seam-based resizing has been reached, shown as the positive exit from 1040, the method includes performing additional resizing using one or more scaling techniques. This is shown as 1050 in FIG. 10. As described above, any of a number of scaling techniques may be applied to further reduce or expand the image. In some embodiments, after applying a scaling technique to the image, the scaled image may be re-sampled to realign the pixels of the image to a regular grid, as shown. In other embodiments, the image may not be re-sampled after a scaling operation, or the image may be re-sampled only after the resizing target has been met, e.g., after two or more scaling operations have been applied to the image (not shown). Such re-sampling is described in more detail below.

In this example, additional scaling operations may be applied to the image if the scaling applied at 1050 is not sufficient to achieve the target size and/or aspect ratio for the resizing operation. This is shown as the feedback loop from 1060 to 1050. Once the image has been resized to the target size, shown as the positive exit from 1060, data representing the resized image may be output, as in 1070. The resized image may be displayed to the user and/or the output data may be stored for further processing or for other purposes, as described above. Note that, as in the example illustrated in FIG. 2, the method illustrated in FIG. 10 may in various embodiments be applied to reduction of an image, expansion of an image, or a combination of reduction and expansion operations in order to resize the image to its target size and/or aspect ratio (as in FIGS. 1A-1B).

As noted above, in some embodiments, the user may specify a seam carving tolerance level through a user interface of an image editing application. For, example, in one embodiment, the user interface may include a tolerance slider bar, which with to specify values (%) from 0-100. In this example, a value of 100 represents a high tolerance for seam carving, by specifying that seam carving alone may be used to achieve the resizing operation, and 0 represents a lack of tolerance for seam carving, by specifying that no seam carving operations may be performed as part of the resizing operation. Anything in between specifies the use of the hybrid method described above. For example, if an image is to be reduced by 50 pixels and the tolerance slider is set to 50%, then the hybrid method would remove 25 pixels using seam carving and would reduce the image by another 25 pixels using a scaling technique. In some embodiments, the user may adjust the slider bar value while observing the effects of the resizing operation to determine the level at which the results are visually acceptable. In other embodiments, a seam carving tolerance may be specified through another type of user interface element (e.g., a pull-down menu, radio button, or alphanumeric input field).

As described above, current seam carving techniques employ a winner-takes-all (or loser-loses-all) method. For example, the first 50 seams (the 50 lowest energy seams) may be removed, but the pain may not be shared across the image. In an alternative embodiment that uses a combination of seam carving and standard image scaling techniques to reduce or expand an image, all the seams in the image may be computed, and a non-linear scaling may be applied based on the energy of each seam. In other words, a seam carving technique may be used to identify low-energy seams to be scaled (up or down). Then, a variable scaling factor may be applied to each of the identified seams, dependent (for example) on the average or total energy value of each of the identified seams. For example, in one embodiment, the lowest energy seam may be scaled up or down by an amount that is twice that of the scaling of the next lowest energy seam, and so on. This technique may in some embodiments be used in conjunction with a look-up table to determine an amount of scaling to be applied to seams having a given energy value or an energy value in a given range of energy values, as described above. In other embodiments, an exponential decay or another function may be applied to determine the scaling factors to be applied to each of the identified seams.

In one example, if the energy of the first seam (i.e., the lowest-cost seam) is 1 and the energy of the $100^{th}$ seam is 75, the seams may be proportionally rescaled according to their weight such that the overall reduction is 50 pixels. This hybrid resizing operation combines seam based techniques and scaling on a per-seam basis. For example, if the width of an image is to be reduced by 10 pixels, seam scaling may be used to determine the n lowest-cost seams, and the method may determine how much to scale each of the identified seams such that the overall effect will be of reducing the width of the image by 10 pixels. In such embodiments, the number of seams to scale, n, may be a user-defined parameter (e.g., it may be specified through a user interface of an image editing application), and it may be greater than or equal to the number of pixels/seams to be removed from the image (or the number of pixels/seams to be added to the image in an expansion operation). For example, if Z(i) represents the energy of a seam i, then given seams Z_1, ..., Z_n and k (the number of pixels by which the image is to be resized), the width of each seam may be scaled by:

$$\text{scale}(i) = (k * Z\_i) / \text{sum}(Z\_i)$$

Figure 11:
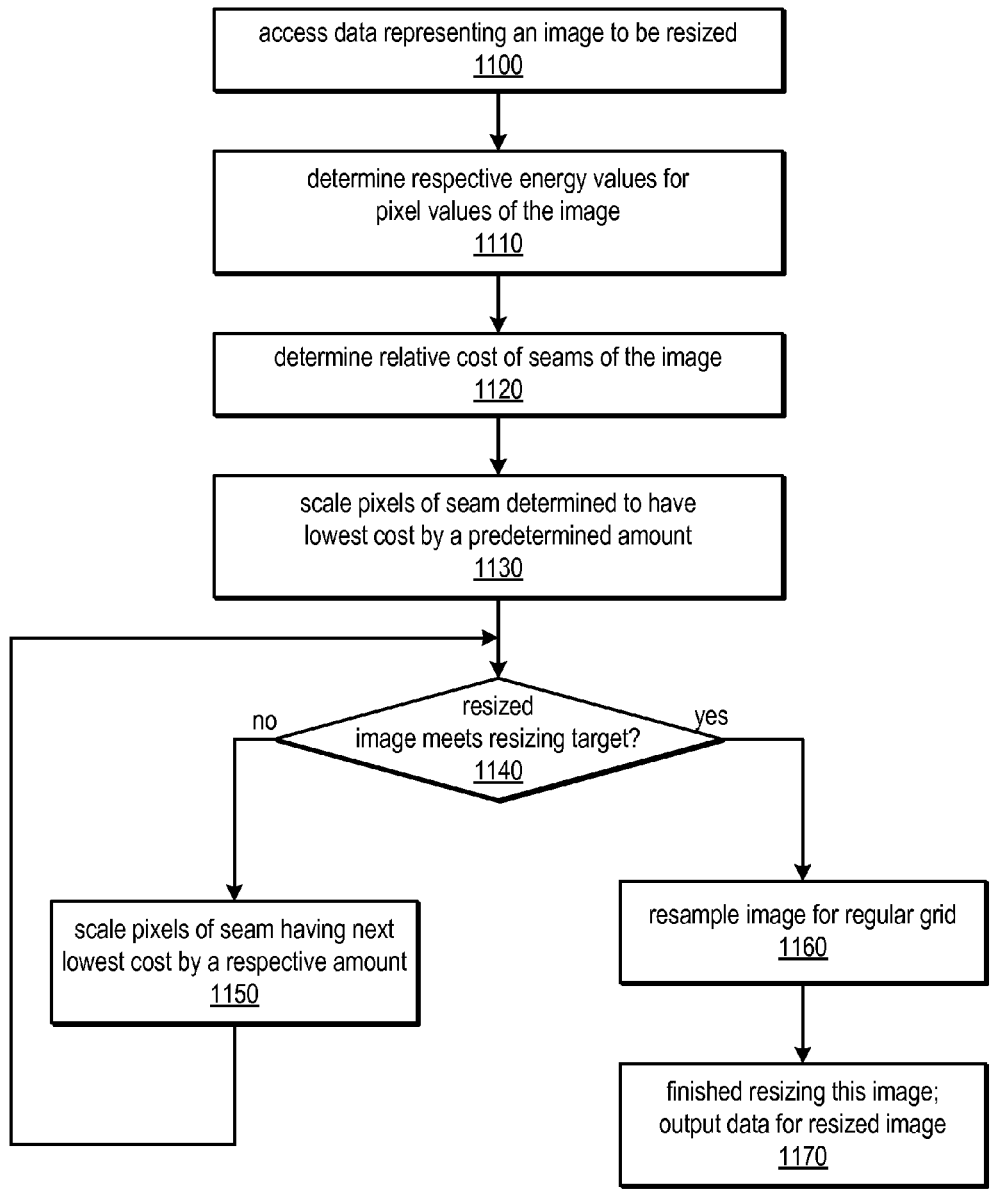
FIG. 11 is a flow chart illustrating a hybrid method for resizing images along seams using scaling techniques, according to one embodiment.

FIG. 11 illustrates one such hybrid method for image resizing, according to one embodiment. In this example, as in the previous examples, the method may include accessing data representing an image to be resized, as in 1100. In this example, the method includes determining energy values for the pixel values of the image, as in 1110. These energy values may be determined using any of the methods described herein, or another method, in various embodiments. The method may also include determining the relative costs of one or more seams of the image (as in 1120) dependent on the determined energy values, again, using any suitable method for determining seam cost, including those described herein.

In the example illustrated in FIG. 11, the method includes scaling the pixels of a seam determined to have the lowest cost by a predetermined amount, as in 1130. For example, in one embodiment, the lowest-cost seam may be scaled up or down by a predetermined maximum percentage (e.g., 50% or 100% for a reduction operation, 75%, 100% or 150% for an expansion operation). Note that in this example, specifying a reduction of 100% is equivalent to removal of a seam, and specifying an expansion of 100% is equivalent to replication a seam (e.g., replicating each pixel with one copy of that pixel).

If the target size and/or aspect ratio for the resizing operation are not met by scaling the lowest-cost seam, shown as the negative exit from 1140, the method may include performing an additional scaling operation on the next lowest cost seam, as in 1150. This scaling operation may apply a different scaling factor than the previous scaling operation, in some embodiments. For example, in one embodiment, the scaling factor applied in the second scaling operation (i.e., the scaling operation applied to the second lowest-cost seam) may be half that of the maximum scaling factor, or the maximum scaling factor may be reduced by a given percentage for the second and subsequent scaling operations. In other embodiments, the same scaling factor may be applied in two or more scaling operations before being reduced for one or more subsequent scaling operations (e.g., the first ten scaling operations may apply a maximum scaling factor, the next ten may apply a scaling factor that is half of the maximum value, and so on). In still other embodiments, a look-up table may be used to specify a scaling factor to be applied to seams in cost order (e.g., indexed by their position in cost order), or to specify a scaling factor to be applied to seams of a given cost or in a given cost range. In some embodiments, a maximum scaling factor or a range of scaling factors to be used may be configurable by a user (e.g., through a user interface of an image editing application). Note that the number of seams to be scaled may in some embodiments be specified to be equal to the number of seams in the image. In other words, all of the seams of the image may be scaled as part of the hybrid resizing operation, but they may not all be scaled by the same amount.

In this example, additional scaling operations may be applied to various seams in ascending cost order until the resizing target is met. This is shown as the feedback loop from 1150 to 1140. Once the image has been resized to the target size, shown as the positive exit from 1140, the scaled image may be re-sampled to realign the pixels of the image to a regular grid, as in 1160. In other embodiments, the image may be re-sampled after each scaling operation (not shown). In this example, data representing the resized image may be output, as in 1170. The resized image may be displayed to the user and/or the output data may be stored for further processing or for other purposes, as described above. Note that the method illustrated in FIG. 11 may in various embodiments be applied to reduction of an image, expansion of an image, or a combination of reduction and expansion operations in order to resize the image to its target size and/or aspect ratio (as in FIGS. 1A-1B).

Several of the examples described herein for image resizing include a re-sampling operation. One example of such a re-sampling operation is described as follows. An image may be thought of as a grid of pixels where the distance between any pair of adjacent pixels is 1. As described above, a seam carving operation may remove a column or seam from the image, and all the other pixels may be moved over by one position in the grid. If a hybrid technique is applied that includes a scaling operation on a given seam or seams, each of the pixels on those seams may move a fraction of a pixel (e.g., 0.2 pixels) to the left or right. Therefore, instead of a regular grid of pixels that constitutes an image, an image resized using such scaling techniques may have an irregular grid of pixels. These pixels may need to be re-sampled in order to obtain an image that can be displayed by the image editing application. Various digital signal processing techniques may be applied to sample such irregular grids and to obtain values to put on a regular grid. In one example, an image may be passed through a non-linear function using look-up table for resizing. The look-up table may specify that all seams having energy values less than 7 should be completely removed, all seams having energy values between 7 and 25 should be rescaled by half, and all seams having energy values greater than 25 should be rescaled by 0.75 (or not rescaled at all). Once these scaling factors are applied and the new set of pixels does not sit on a regular gird, they may be re-sampled to position them on a regular grid to produce the resized image.

In an image expansion operation based on seam carving techniques, another embodiment may provide replication of each of a number of identified low-energy seams by a variable amount dependent on the average or total energy value of each of the identified seams. In some embodiments, seams may be replicated by adding an exponentially decaying number of replicas for each of the lowest seams. This may introduce less energy into the overall image without stretching the lowest seam only. In one embodiment, a logarithmic weight may be associated with each seam to determine the number of times the seam should be replicated. For example, the lowest energy seam may be replicated twice as many times as the next lowest energy seam, and so on. In another example, to add 9 seams, the lowest-cost seam may be replicated 4 times, the second lowest-cost seam may be replicated 3 times, the third lowest-cost seam may be replicated twice, and the fourth lowest-cost seam may be replicated once.

This technique may in some embodiments provide a non-linear method of adding seams, by assigning a higher replication priority (and a corresponding higher replication factor) to the lowest-energy seams. In one embodiment, a radix (r) may be used to determine the number of times each seam should be replicated as follows: $N\_i = \text{ceil}(\log\_r(S\_i))$, where $N\_i$ is the number of times seam i will be replicated, and $S\_i = (\text{Total} - S\_(i-1))$, $S\_0 = 0$. As with other resizing techniques described herein, in other embodiments, an exponential decay or other function, or a look-up table may be used to determine the respective replication factors for each seam (e.g., dependent on the cost of each seam or on two or more ranges of seam costs).

Figure 12:
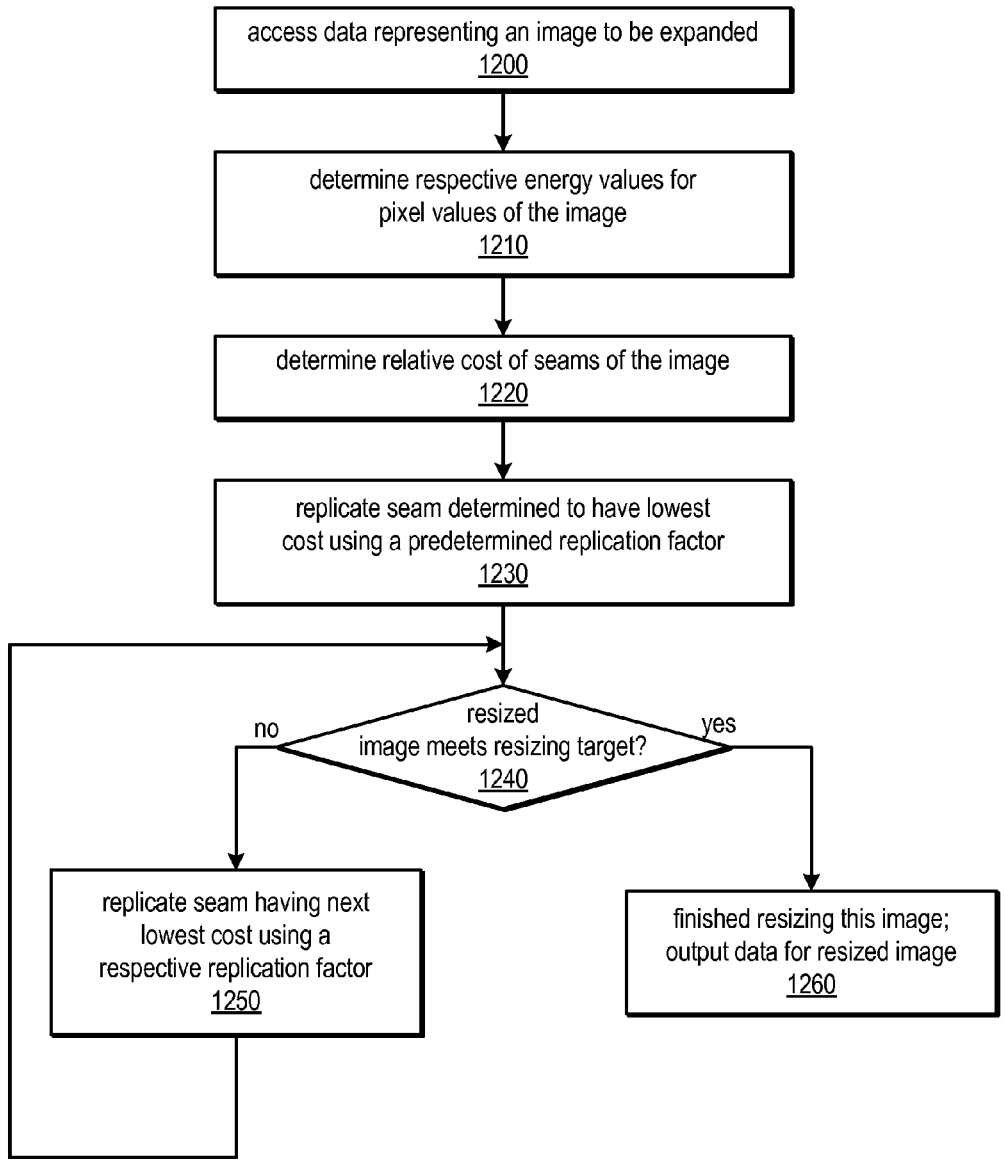
FIG. 12 is a flow chart illustrating a method for expanding images along seams with a variable replication factor, according to one embodiment.

FIG. 12 illustrates one such method for image expansion. In this example, the method may include accessing data representing an image to be expanded, as in 1200, determining energy values for the pixel values of the image, as in 1210, and determining the relative costs of one or more seams of the image (as in 1220) dependent on the determined energy values, again, using any suitable method for determining energy values and/or seam costs, including those described herein.

In this example, the method includes replicating the seam determined to have the lowest cost a predetermined number of times, which may correspond to a specified maximum replication factor. For example, in one embodiment, the lowest-cost seam may be replicated eight times. If the resizing target for the image is not met by replicating the lowest-cost seam, shown as the negative exit from 1240, the method may include replicating the seam determined to have the next lowest cost (as in 1250), and so on, until the resizing target is reached. This is shown as the feedback loop from 1250 to 1240. In this example, a different replication factor may be applied to the second and/or subsequent replication operations. For example, the seam determined to have the second lowest cost may be replicated four times, and the seam determined to have the third lowest cost may be replicated twice. In other embodiments, the same replication factor may be applied in two or more replication operations before being reduced for one or more subsequent scaling operations (e.g., the first ten replication operations may apply a maximum replication factor, the next ten may apply a replication factor that is half of the maximum value, and so on). In some embodiments, a look-up table may be used to specify a replication factor to be applied to seams in cost order (e.g., indexed by their position in cost order), or to specify a replication factor to be applied to seams of a given cost or in a given cost range. In other embodiments, a maximum replication factor or a range of replication factors to be used may be configurable by a user (e.g., through a user interface of an image editing application).

Once the image has been expanded to the target size, shown as the positive exit from 1240, data representing the resized image may be output, as in 1260. The resized image may be displayed to the user and/or the output data may be stored for further processing or for other purposes, as described above. Note that the method illustrated in FIG. 12 may in various embodiments be applied to expansion of an image, or to perform expansion as part of a combination of reduction and expansion operations in order to resize the image to its target size and/or aspect ratio (as in FIGS. 1A-1B).

In various image editing applications, a user may wish to define different regions in the image (e.g., by creating boxes around them using a GUI tool) and to apply content-aware resizing operations (e.g., seam carving or a hybrid resizing technique) independently on each region. In such embodiments, seams may be computed (i.e., costs determined and candidate identified for removal or replication) only within the bounding box of each region. For example, in one embodiment, an entire image may be rescaled so that a region defined by a particular bounding box becomes 20 pixels smaller, but the content within the bounding box may be seam carved (or resized using a hybrid technique) to fit the new size. Such a technique may be applied to two or more regions in the image to create a more complicated effect that the user may control. In some embodiments, the regions defined by each box may be scaled by the same amount (based on the reduction goal for the overall image) but within each region, the image may seam carved (or resized using a hybrid technique) specifically dependent on its local content. In various embodiment the same resizing technique may be applied to each region, or different methods or mixes of methods may be applied to each region.

In one example, a user may select a busy area of the image (or an area of particular interest) on which to apply scaling, or to protect from resizing altogether, and may select a different (i.e., a less busy or interesting) area in which to apply seam carving or a mix of seam carving and scaling, as described above. The user may define the bounding boxes or regions using a selection tool or other user interface mechanism of an image editing application, in various embodiments. In such embodiments, seam carving or hybrid techniques applied with a region or bounding box may not be affected by the content of the image outside the region (e.g., by much higher energy or much lower energy areas outside the box). This technique may allow designation of different regions of an image and may apply seam carving techniques, scaling techniques, and/or hybrid techniques to each region independent of their application to other regions. Each region may in some embodiments be reduced or expanded by the same amount, dependent on an overall reduction or expansion target for the overall image, but the techniques may be applied to each region based on its local content. In other embodiments, different regions may be reduced or expanded by different amounts such that when an image is reconstituted from each of the resized regions, the overall resized image meets a specified target size and/or aspect ratio. In some embodiments, an additional resizing operation (e.g., a seam carving, scaling, or hybrid resizing operation) may be applied to an image that has been reconstituted from two or more resized regions to achieve further resizing. In some such embodiments, regions that have been resized locally may be protected with respect to such a resizing operation on the whole image. In other words, such a "whole image" resizing operation may only be applied in regions that were not resized locally, or that were not designated as regions of interest by the user. In still other embodiments, one or more selected regions may be independently resized (e.g., using seam carving to expand or remove pixels of a given color or color range, or to emphasize a particularly important element or de-emphasize a less significant element in the image region) while the rest of the image may remain unchanged. In some such embodiments, any resized portions may be scaled back to their original size to fill the space previously occupied by the corresponding regions of the input image. For example, one or more seams may be removed from an image region using seam carving techniques, and the resulting resized region may be scaled to expand it back to its original size. Conversely, seam carving techniques may be applied to an image region to expand it (e.g., by replicating one or more seams), and the resulting resized region may be scaled to reduce it back to its original size.

Figure 13:
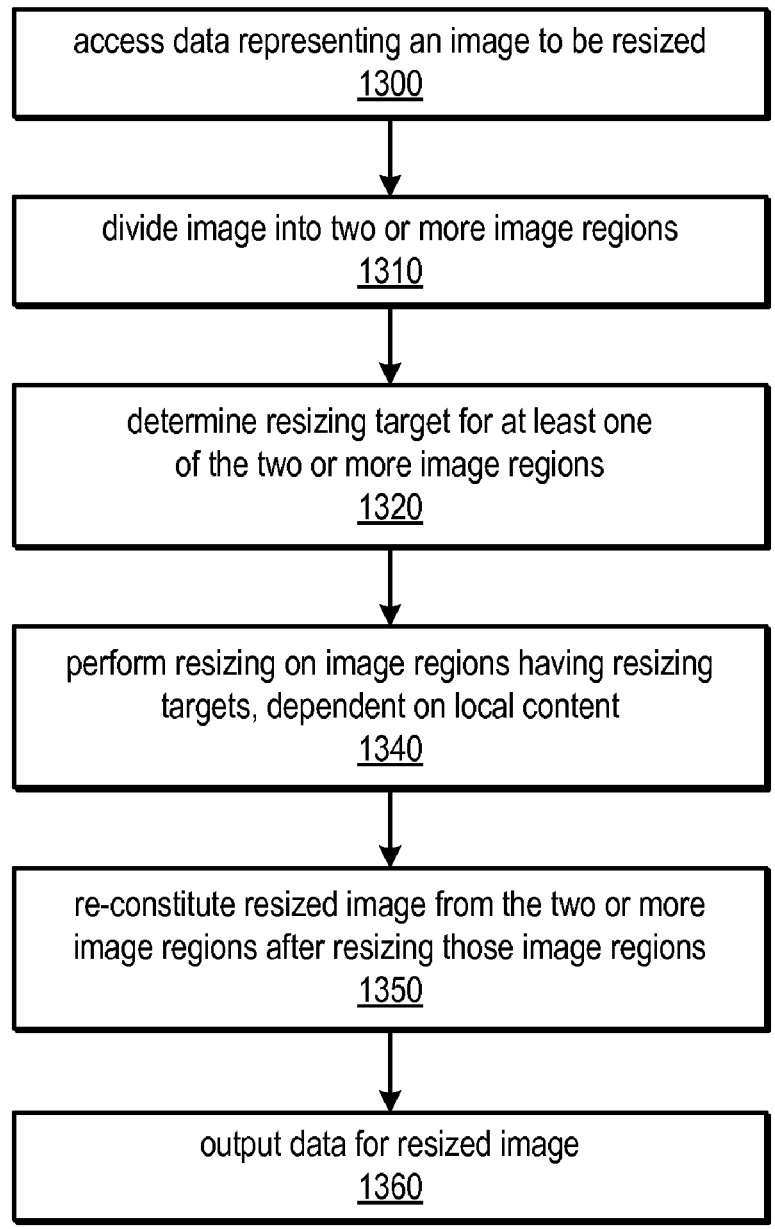
FIG. 13 is a flow chart illustrating a method for resizing an image dependent on resizing one or more regions of the image dependent on local content, according to one embodiment.

One method for applying resizing to different regions of an image is illustrated by the flow chart in FIG. 13. In this example, as in the previous examples, the method may include accessing data representing an image to be resized, as in 1300. In this example, the method includes dividing the image into two or more regions of interest, as in 1310. For example, one or more regions of an image may be defined and/or designated to be resized separately, based on local content, as part of resizing the overall image to meet a specified resizing target (e.g., a target size and/or aspect ratio). In some embodiments, one or more of the regions of interest may not be resized, e.g., they may be protected from resizing, even as the overall image is resized. In different embodiments, the regions of interest defined by the user may be non-overlapping. In some embodiments, the designated regions may together constitute the entire input image, while in others the entire image may not be represented by the collection of designated regions (i.e., some portions of the image may not be designated as regions of interest to which resizing should be applied based on local content).

In the example illustrated in FIG. 13, the method may include, for each of the regions to which resizing is to be applied, determining a resizing target for the region, as in 1320. For example, all of the designated regions may be resized by the same proportion, same width, same height, or to the same aspect ratio, or each region may have its own resizing target based on the proportion of the image that is covered by the region or the importance of the region, so that overall image is resized to targeted size and/or aspect ratio, without losing an excessive amount of content in particularly important regions.

In this example, each of the regions to be resized may be resized independently, as in 1340, dependent on their local content. For example, any of the resizing operations described herein (e.g., those employing seam-based techniques, scaling techniques, or hybrid techniques) may be applied to the each region based on the content of that region. In some embodiments, a same resizing technique may be applied to all of the regions. In other embodiments, different resizing techniques may be applied to different ones of the regions. Note also that in some embodiments, one region of the image may be reduced or expanded, or may be resized using a combination of reduction and expansion operations, independent of whether other regions are reduced or expanded. As noted above, some regions may not be resized at all.

Once all of the regions to be resized have been resized to their targets, the overall image may be reconstituted from the two or more regions, as in 1350. Data representing the resized image may then be output, as in 1360. As in previous examples, the resized image may be displayed to the user and/or the output data may be stored for further processing or for other purposes, as described above.

In some embodiments, the computations required for performing image resizing (e.g., seam carving and/or hybrid resizing techniques, as described herein) may be accelerated through the use of pyramidal retargeting. Pyramidal retargeting may be used to generate a lower-resolution image on which to apply various techniques, such that they may be executed more efficiently than when applied to a full-resolution image. For example, for an image having more than 2000×2000 pixels, it may be difficult to achieve interactive performance using a standard seam carving algorithm. Therefore, in some embodiments, an image pyramid may be generated to represent the image, and a solution may be computed on a higher pyramid image (i.e., one which represents a lower-resolution version of the image). That solution may then be projected onto a lower pyramid level (e.g., the full resolution image or another version of the image having higher resolution that the version on which the solution was computed) in order to obtain the solution faster than if it were computed on the full-resolution image. For example, for 4000×4000 image (level 0), a pyramid may be generated in which the second level (level 1) is 2000×2000, the third level (level 2) is 1000×1000, the fourth level (level 3) is 500×500, and so on. A pyramid level on which to work may be selected such that the solution may be efficiently computed interactively, and then the solution may be projected onto another level to be shown the user. In one embodiment, for each level of the pyramid, a Gaussian filter may be applied. In other embodiments, an image pyramid may be generated using other functions (e.g., an average, sum, bi-cubic, maximum, nearest neighbor, etc.) to reduce the image size to a level that can be operated on interactively.

Figure 14:
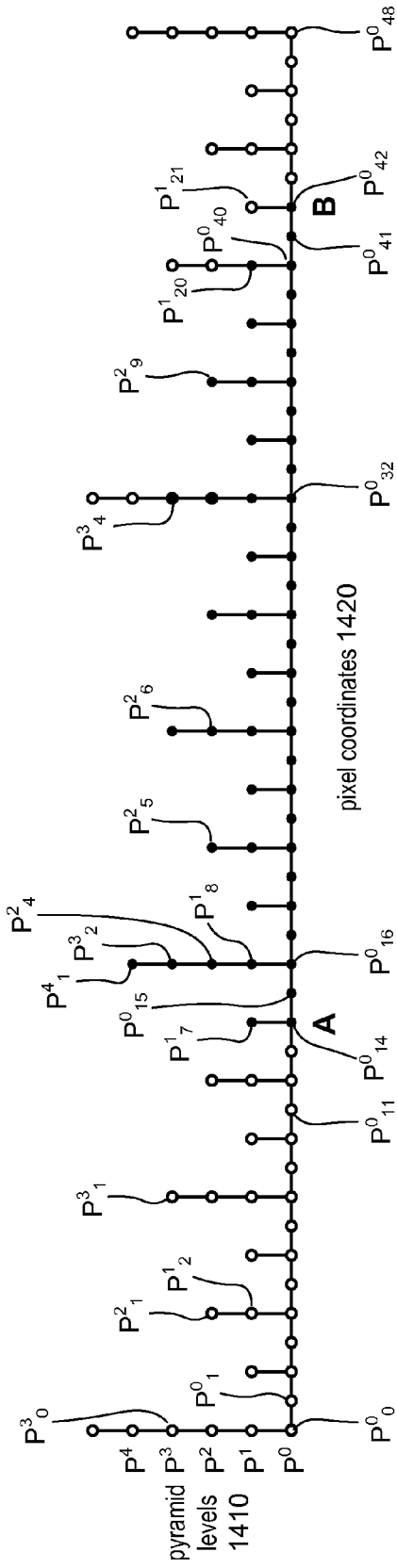
FIG. 14 is a conceptual diagram illustrating pixel values in an image pyramid, according to one embodiment.

An image pyramid may be further described by the example illustrated in FIG. 14. FIG. 14 depicts a conceptual diagram of an image pyramid, according to one embodiment. In this example, the points along the horizontal axis (pixel coordinates 1420) represent pixels in a single row (e.g., a single scan line) of an image, in order of their location within the row. Each point has a pixel value, indicating a color, intensity, and/or other property of the pixel. Each of the points, some of which are labeled, may be referred to as $P^1_n$, where 1 represents the level of the point (i.e., corresponding to a respective pyramid level 1410), and n represents the position of the point in the row. For example, the pixel value at $P^0_0$ represents the color, intensity, and/or other property of the leftmost pixel in the row. In this example, all of the points along the horizontal axis represent the actual (e.g., original) pixels of an input image. Therefore, their level in the corresponding pyramid data structure is 0. Each of the points on the $P^1$ level (i.e., those located immediately above the $P^0$ points) represents an acceleration data value for a block of two pixels. For example, the value of $P^1_7$ is the result of an associative operation on the pixel values at $P^0_{14}$ and $P^0_{15}$. Similarly, the value of $P^1_{20}$ is the result of an associative operation on the pixel values at $P^0_{40}$ and $P^0_{41}$. In this example, each of the points on the $P^2$ level represents an acceleration value for a block of four pixels. For example, the value of $P^2_4$ is the result of an associative operation on the pixel values at $P^0_{16}$, $P^0_{17}$, $P^0_{18}$, and $P^0_{19}$. In various embodiments, the acceleration values for each of the points on a given level may be generated by performing an associative operation on the pixels values of the input image, or on acceleration values for a lower level of the acceleration data structure, in different embodiments.

Pixel values for one or more accelerated images (i.e., image pyramid data) may be stored in any appropriate data structure, including, but not limited to, one or more tables, databases, lists, linked lists, or arrays, in various embodiments. The table below, Table 2, illustrates one example of the data that may be stored at the second level ($P^1$) of an image pyramid for an addition operation. In this example, the first column illustrates an index value associated with each of the pixels of the accelerated image at this level, and the second column illustrates a calculation for the value of each of the pixels of the accelerated image at this level. For example, the value of the pixel associated with index value 2 may be calculated as the sum of the values of the fourth and fifth pixels of the original image. The result of each calculation may be stored in a table, database, or other suitable data structure, along with the index value, in some embodiments. In some embodiments, additional information, such as an identifier of the acceleration level, an identifier of the associative operator, or a list of pixels corresponding to a block of pixels in the original image represented by each value (as shown in column 3) may also be stored with each index value.

TABLE 2

| $P^1$ index | accelerated pixel value | pixels in corresponding block of original image |
|---|---|---|
| 0 | $P^1_0 = P^0_0 + P^0_1$ | $P^0_0, P^0_1$ |
| 1 | $P^1_1 = P^0_2 + P^0_3$ | $P^0_2, P^0_3$ |
| 2 | $P^1_2 = P^0_4 + P^0_5$ | $P^0_4, P^0_5$ |
| ... | ... | ... |
| n | $P^1_n = P^0_{2n} + P^0_{2n+1}$ | $P^0_{2n}, P^0_{2n+1}$ |

In a second example, Table 3 illustrates the data that may be stored at the third level ($P^2$) of an image pyramid using a min filtering operation. In this example, the first column illustrates an index value associated with each of the pixels of the accelerated image at this level, the second column illustrates a calculation for the value of each of the pixels of the accelerated image at this level, and the third column illustrates an alternate method of calculating the value of each pixel in the acceleration image. For example, the value of the pixel associated with index value 2 may be calculated as the minimum of the values of the eighth, ninth, tenth, and eleventh pixels of the original image, or may be calculated as the minimum of the values of the fourth and fifth pixels of a second level ($P^1$) of the image pyramid. The result of either of these calculations for each index value may be stored in a table, database, or other suitable data structure, along with the index value, in some embodiments. In some embodiments, additional information, such as an identifier of the acceleration level, an identifier of the associative operator, or a list of pixels corresponding to a block of pixels in the original image represented by each value (as shown in column four) may also be stored with each index value.

TABLE 3

| $P^2$ index | accelerated pixel value | alternate calculation of accelerated pixel value | pixels in block of original image |
|---|---|---|---|
| 0 | $P^2_0 = \min(P^0_0, P^0_1, P^0_2, P^0_3)$ | $P^2_0 = \min(P^1_0, P^1_1)$ | $P^0_0, P^0_1, P^0_2, P^0_3$ |
| 1 | $P^2_1 = \min(P^0_4, P^0_5, P^0_6, P^0_7)$ | $P^2_1 = \min(P^1_2, P^1_3)$ | $P^0_4, P^0_5, P^0_6, P^0_7$ |
| 2 | $P^2_2 = \min(P^0_8, P^0_9, P^0_{10}, P^0_{11})$ | $P^2_2 = \min(P^1_4, P^1_5)$ | $P^0_8, P^0_9, P^0_{10}, P^0_{11}$ |
| ... | ... | ... | ... |
| n | $P^2_n = \min(P^0_{4n}, P^0_{4n+1}, P^0_{4n+2}, P^0_{4n+3})$ | $P^2_n = \min(P^1_{2n}, P^1_{2n+1})$ | $P^0_{4n}, P^0_{4n+1}, P^0_{4n+2}, P^0_{4n+3}$ |

The block addressing mechanism described above may in some embodiments facilitate efficient software coding of the algorithms used to generate acceleration data structures and/or to calculate seam carving and/or resizing solution on the lower-resolution images represented by those data structures.

In different embodiments, each acceleration data structure may include only one level of acceleration data or may include two or more levels of acceleration data. For example, additional columns may be used to identify the particular acceleration level for each table entry. Similarly, in different embodiments, an acceleration data structure may include acceleration data for only one associative operation or for more than one associative operation. For example, additional columns may be used to identify the associative operation performed to calculate each table entry. Any or all of the acceleration data described above may be pre-computed for an entire image, or for any portion thereof, when an image is opened in a graphics application, when a filter is first selected for operating on an image, or at any time during execution of a graphics application, in various embodiments.

In some embodiments, acceleration data may be computed by a software application executing in parallel on two or more GPUs, in some embodiments. For example, an acceleration table may be generated for one level of acceleration on one graphics processor while an acceleration table is generated for another level of acceleration on a second graphics processor. In another example, an acceleration table may be generated for one associative operation on one graphics processor while an acceleration table for another associative operation is generated on a second graphics processor. In yet another example, acceleration data may be generated for one portion of an image on one graphics processor while acceleration data for another portion of the image is generated on a second graphics processor. The acceleration data generated by multiple processors in any of these examples, or in other embodiments, may all be stored in one acceleration data structure or may be partitioned into multiple acceleration data structures, as described above.

As described above, a resizing solution (e.g., identification of low-cost seams) may be computed at a higher level of the pyramid than will be displayed and may be projected to a lower level of the pyramid. In some cases, this may result in chunky artifacts at the lower level, because every seam in the higher level of the pyramid corresponds to a sleeve or band of pixels in the lower levels of the pyramid. In other words, if the entire band is removed from the higher resolution version (corresponding to the lower level of the pyramid) chunky artifacts may be seen because, for example, 8 pixels at a time may have been removed. Therefore, in some embodiments, a resizing operation may perform seam carving within the band defined by the solution found at the higher pyramid level, based on local content in the higher resolution version of the image. In other words, the high level pyramid may used to determine a band in which to apply seam carving at the lower level (e.g., to identify the lowest energy portion of the band).

In some embodiments, such a technique may use pyramidal retargeting to reduce the complexity of seam carving computations. As described above, an image pyramid may be generated based on any of a number of suitable functions of the pixel data (e.g., color and/or intensity) or functions of the energy values of each pixel. A reduction or expansion solution may be developed using seam carving techniques on a low-resolution version of an image to identify a band for reduction/expansion in the higher-resolution image. Seam carving techniques may then be applied to the identified band in the higher resolution image based on its local content. In various embodiments, the number of bands to be so identified may be configurable by a user (e.g., through a user interface of an image editing application).

In various embodiments, for every seam identified for removal in a lower resolution version of the image, the number of seams to be removed in a higher-resolution version is the number of seams identified in the lower resolution version multiplied by 2 times the level difference of the higher-resolution image. For example, if the lower-resolution solution was computed on level 2 of the image pyramid, and the solution is to be projected to level 0, every pixel in the lower-resolution solution represents a 4×4 set of pixels in the level 0 solution. Therefore, every seam in the lower-resolution version of the image corresponds to 4 seams in the higher-resolution version. In this example, if the solution computed on the lower-resolution version indicated that 2 seams should be removed, 8 seams must be removed from the higher-resolution image.

In some embodiments, the band in which resizing is to be applied in the higher-resolution image may be expanded to obtain a smoother solution. If it is not, the number of pixels to be removed, for example, may be the same as the number of pixels in the band, such that the same result is obtained as if the lower-resolution solution were projected directly on the higher-resolution image. This may result in a less than desirable output image, since all of the pixels removed would be adjacent to each other (e.g., removing the content for a width swath of the image). Expanding the bands (e.g., artificially widening them to include one or more additional seams in the higher-resolution image that are adjacent to the seams corresponding directly to the seams of the lower-resolution image) may allow the method an opportunity to determine a smoother and/or more visually appealing solution. In some embodiments, each band may be expanded by a fixed number of pixels. In another embodiment, the expansion may be dependent on the difference between the scale of the image on which the solution was computed and the image on which it is to be projected. For example, if the scale difference between lower-resolution image and the higher-resolution image is 8 pixels, then the bands may be 8-pixels wide. These bands may be padded by scaleDifference/2 pixels, in this case, 4 pixels, on both sides, in order to compute a smoother solution inside the band by removing 8 of the 16 pixels of the expanded band, rather than just removing the 8 pixels of the identified band. In various embodiments, each of the identified bands may be expanded by a different amount, e.g., based on local content. For example, a band may be expanded to take into account energy differences in a direction orthogonal to the reduction or expansion operation being performed.

In one embodiment, a vertical gradient may be used to determine the width of a vertical seam. This may be used to avoid jaggies and chunky results for long image-wide edges in the image, in some embodiments. For example, an image of a cave may include a circular arc in most of the image, as if the viewer is looking out of the cave to a scene (e.g., the image may be mostly black around the outside of the arc and a scene may be depicted inside the arc). If seam carving is applied to this image, no matter the resolution, if the image is reduced, the result may include jagged edges along the curve because the bands may not communicate their energy to other bands. Widening the bands, as described above, may help with cross-band energy communication. In other words, as noted above, the method may involve looking at the energy orthogonal to the direction in which seam carving is being applied and using that information to guide the width of the band. In some embodiments the width of the band may vary based on the content of the image (e.g., the content in the other direction). Note that in some embodiments, it may be desirable for the identified bands to overlap more where there is higher energy. For example, if an image is being reduced horizontally, the method may need to take into account the vertical energy in the image. In some embodiments, all the bands to work on may be identified in the lower-resolution image up front, and may be expanded in the higher-resolution version of the image (e.g., with or without overlapping). In such embodiments, resizing operations may be performed on two or more of the expanded seams, without going back to the lower-resolution image to find the next band. In other embodiments, each band may be identified one at a time, and operated on in the higher-resolution version of the image before identifying the next band.

Figure 15:
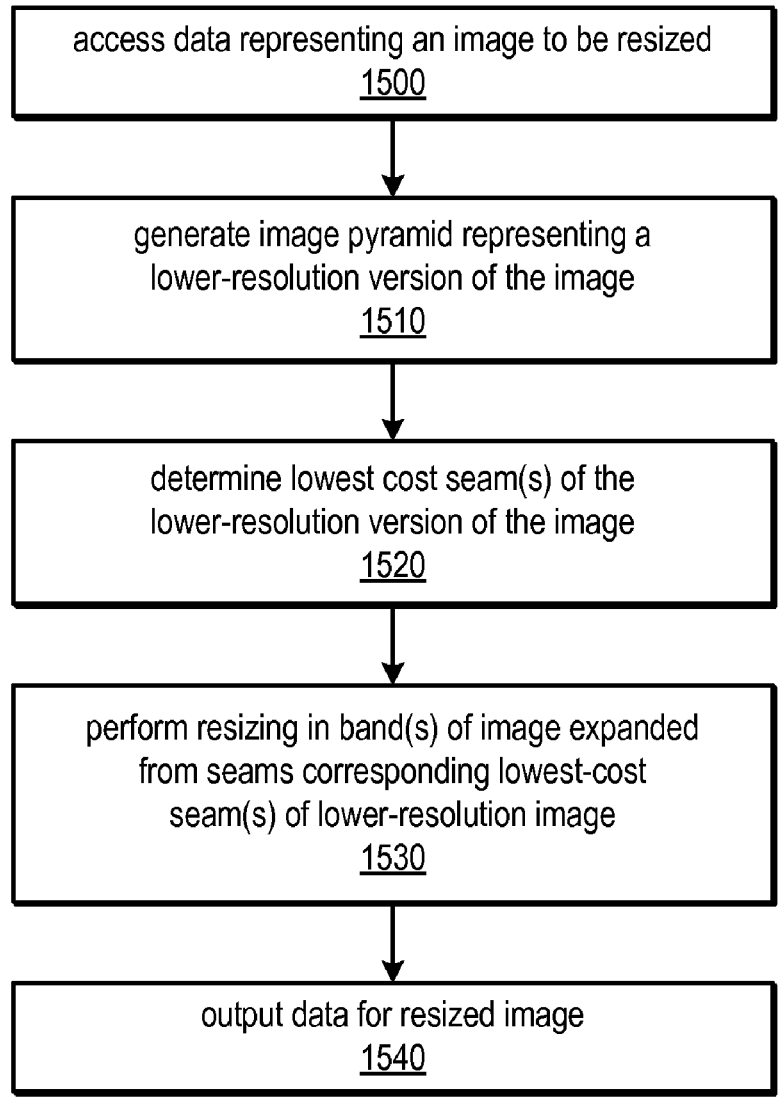
FIG. 15 is a flow chart illustrating a method for resizing an input image dependent on identification of low-cost seams in a lower-resolution version of the image, according to one embodiment.

One embodiment of a method for performing resizing using banded seam carving is illustrated by the flow chart in FIG. 15. In this example, data representing an image to be resized, as in 1500, and an acceleration data structure, or image pyramid, is generated representing a lower-resolution version of the image, as in 1510. The image pyramid may be generated based on the sum, difference, average, minimum, or maximum values of the pixels in the input image, or using any other suitable function (e.g., a bi-cubic, nearest neighbor, or Gaussian filter) to generate an acceleration data structure, in different embodiments. The image pyramid may have any number of acceleration levels, and any of these levels may be used in determining a band in which to apply various resizing operations (e.g., seam carving or replication). In some embodiments, respective energy values may be determined for each of the values in the acceleration data structure. In other embodiments, respective energy values may be determined for the pixel values of the input image, and these energy values may be propagated in the image pyramid. In other words, a function may be applied to energy values corresponding to the pixels of the input image to determine the values in the acceleration data structure, rather than populating the acceleration data structure with values derived as a function of the input image pixel values and then determining energy values from those derived values.

In this example, the method may include determining one or more of the lowest-cost seam(s) of a lower-resolution version of the image represented by one of the levels of the image pyramid, as in 1520. The cost of each seam may be determined using any of the methods described herein, or any other suitable method, in different embodiments.

In this example, once the lowest-cost seams are identified, resizing may be applied to the input image within one or more bands of seams corresponding to the low-cost seams identified in the lower resolution version of the image, as in 1530. This resizing may in various embodiments be performed within each band (e.g., dependent on local content) using any of the methods described herein, or using another suitable method. For example, the resizing may be performed using seam-based methods (e.g., by removing or replicating one or more seams of the input image corresponding to a low-cost seam in the lower-resolution image), using scaling techniques (e.g., as applied to one or more seams of the input image corresponding to a low-cost seam in the lower-resolution image), or using a combination of these and/or other methods. As illustrated in FIG. 15 and described herein, in some embodiments, a band of pixels and/or seams to which resizing is applied may be expanded to include additional pixels and/or seams adjacent to those corresponding to the low-cost seams of the lower-resolution image in order to perform a smoother resizing operation. Note that in different embodiments, the bands to which resizing are applied may be expanded by the same or by different amounts (e.g., based on local content and/or user preferences or selection). Similarly, each band may be resized using the same resizing technique or using different resizing techniques, in various embodiments. Note also that, in some embodiments, image bands may be identified and resized one at a time, and a re-calculation may be performed after each resizing to identify the next band to be resized (not shown), rather than identifying multiple bands to be resized from the input image, as shown in FIG. 15.

In this example, once the image is resized to its target size and/or aspect ratio, data representing the resized image may be output, as in 1540. The resized image may be displayed to the user and/or the output data may be stored for further processing or for other purposes, as described above. Note that the method illustrated in FIG. 15 may in various embodiments be applied to reduction of an image, expansion of an image, or to a combination of reduction and expansion operations in order to resize the image to its target size and/or aspect ratio (as in FIGS. 1A-1B).

Note that while the examples described herein primarily involve image pyramids based on pixel values, in some embodiments, the energy values associated with those pixels (rather than the image data itself) may be propagated to the higher levels of the pyramid. Using this information (e.g., energy values) directly in the higher-level image may in some embodiments reduce the artifacts obtained by using image data that is so far removed from the original (e.g., on a high level of the pyramid). In such embodiments, the values of the image pyramid may be generated, for example, as the maximum value of the energy for each 2×2 or 4×4 block of pixels, as the upper levels of the pyramid are constructed, rather than generating them using an average or Gaussian of the pixel values (which may "blend away" a lot of the detail). In that way, the highest energy values in the higher-resolution versions may be preserved in the lower-resolution versions. In other words, not as much detail may be lost in the upper levels of the image pyramid.

Figure 16:
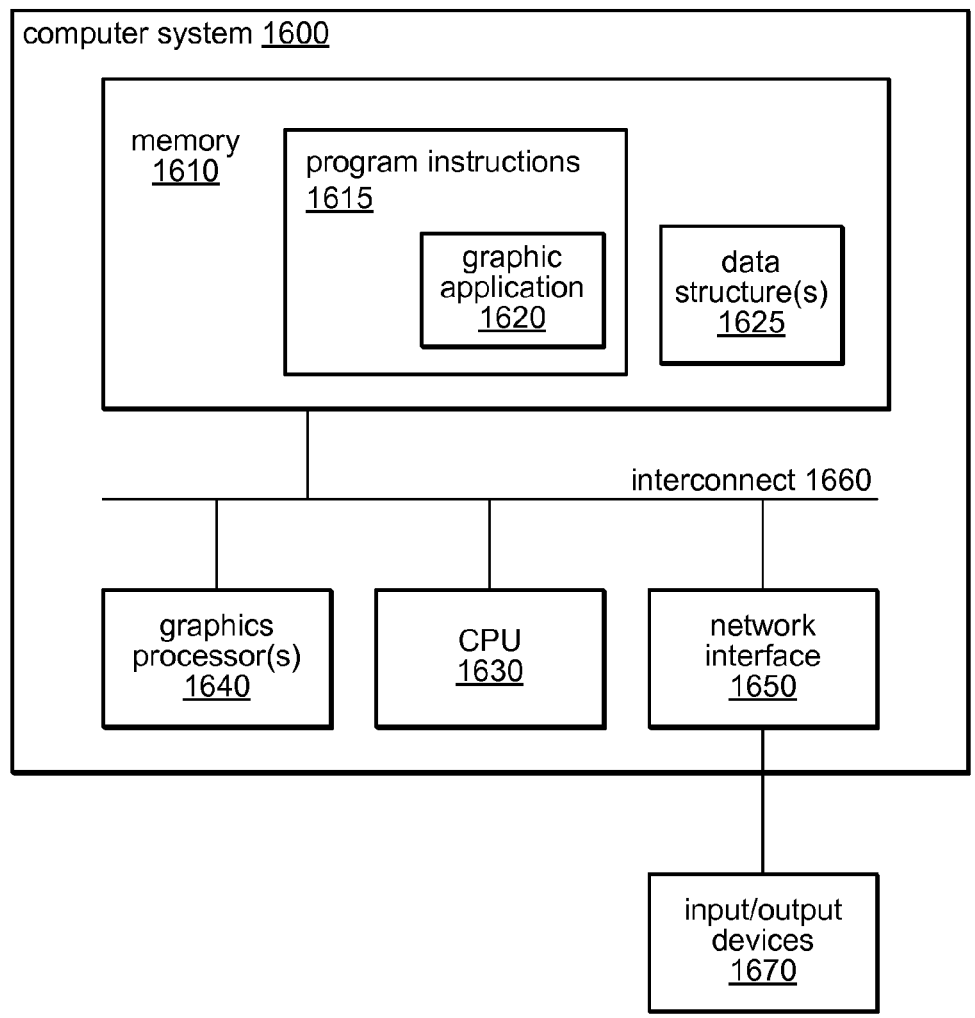
FIG. 16 illustrates a computer system suitable for implementing resizing of input images, according to one embodiment.

The methods described herein for resizing of images (e.g., within a graphics application) may be implemented by a computer system configured to provide the functionality described. FIG. 16 is a block diagram illustrating one embodiment of a computer system 1600 suitable for implementing such image resizing operations. A graphics application such as graphics application 1620 may be configured to perform resizing on image data as part of various editing functions and to render new images according to the resizing. For example, graphics application 1620 may perform reductions and/or expansions of various images using any of the seam-based techniques, scaling techniques, and/or hybrid techniques described herein to resize an input image, according to various embodiments. Graphics application 1620 may be configured to render the resized image to a separate window, or directly into the same frame buffer containing the input image, in different embodiments.

Graphics application 1620 may represent various types of graphics applications, such as painting, publishing, photography, games, animation, and other applications. Additionally, graphics application 1620 may utilize a graphics processor 1640 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1640 may implement a number of graphics primitive operations in a way that makes executing them much faster than drawing directly to the screen with a host central processing unit (CPU), such as CPU 1630. In various embodiments, the methods disclosed herein for generating acceleration data structures and/or the methods disclosed herein for performing resizing of an image may be implemented by program instructions configured for parallel execution on two or more such GPUs. The GPU 1600 may implement one or more application programmer interfaces (APIs) that permit programmers to invoke the functionality of the GPU. Suitable GPUs may be commercially available from vendors such as NVIDIA Corporation, ATI Technologies, and others.

Please note that functionality and/or features described herein as being part of, or performed by, graphics application 1620 may, in some embodiments, be part of, or performed by, one or more graphics processors, such as graphics processor 1640. As described above, in some embodiments graphics application 1620 may be configured to render resized images into a different window than input images.

Resizing of images, as described herein, may be implemented on various types of computer systems. Referring again to FIG. 16, computer system 1600 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1620, which may be configured to implement the resizing techniques described herein, may be provided as a computer program product, or software, that may include a computer-readable storage medium having stored thereon instructions, which may be used to program a computer system (or other electronic devices) to implement image resizing, as described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums.).

As illustrated in FIG. 16, computer system 1600 may include one or more processor units (CPUs) 1630. Processors 1630 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1600, such as various versions of Unix, Linux, Windows™ from Microsoft Corporation, MacOS™ from Apple Corporation, or any other operating system that enables the operation of software on a hardware platform.

The computer system 1600 may also include one or more system memories 1610 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1600 via interconnect 1660. Memory 1610 may include other types of memory as well, or combinations thereof. One or more of memories 1610 may include program instructions 1615 executable by one or more of processors 1630 to implement aspects of the image resizing techniques described herein. Program instructions 1615, which may include program instructions configured to implement graphics application 1620, may be partly or fully resident within the memory 1610 of computer system 1600 at any point in time. Alternatively, program instructions 1615 may be provided to GPU 1640 for performing resizing operations (or portions thereof) on GPU 1640 using one or more of the techniques described herein. In some embodiments, the techniques described herein may be implemented by a combination of program instructions 1615 executed on one or more processors 1630 and one or more GPUs 1640, respectively. Program instructions 1615 may also be stored on an external storage device (not shown) accessible by the processor(s) 1630 and/or GPU 1640, in some embodiments. Any of a variety of such storage devices may be used to store the program instructions 1615 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1630 and/or GPU 1640 through one or more storage or I/O interfaces including, but not limited to, interconnect 1660 or network interface 1650, as described herein. In some embodiments, the program instructions 1615 may be provided to the computer system 1600 via any suitable computer-readable storage medium including memory 1610 and/or external storage devices described above. Memory 1610 may also be configured to implement one or more data structures 1625, such as one or more acceleration data structures and/or structures configured to store data representing one or more input images, output images, or intermediate images. Data structures 1625 may be accessible by processor(s) 1630 and/or GPU 1640 when executing graphics application 1620 or other program instructions 1615.

As shown in FIG. 16, processor(s) 1630 may be coupled to one or more of the other illustrated components by at least one communications bus, such as interconnect 1660 (e.g., a system bus, LDT, PCI, ISA, or other communication bus type), and a network interface 1650 (e.g., an ATM interface, an Ethernet interface, a Frame Relay interface, or other interface). The CPU 1630, the network interface 1650, and the memory 1610 may be coupled to the interconnect 1660. It should also be noted that one or more components of system 1600 might be located remotely and accessed via a network.

As noted above, in some embodiments, memory 1610 may include program instructions 1615, comprising program instructions configured to implement graphics application 1620, as described herein. Graphics application 1620 may be implemented in various embodiments using any desired programming language, scripting language, or combination of programming languages and/or scripting languages, e.g., C, C++, C#, Java™, Perl, etc. For example, in one embodiment, graphics application 1620 may be JAVA based, while in another embodiments, it may be implemented using the C or C++ programming languages. In other embodiments, graphics application 1620 may be implemented using specific graphic languages specifically for developing programs executed by specialize graphics hardware, such as GPU 1640. In addition, graphics application 1620 may be embodied on memory specifically allocated for use by graphics processor(s) 1640, such as memory on a graphics board including graphics processor(s) 1640. Thus, memory 1610 may represent dedicated graphics memory as well as general-purpose system RAM, in various embodiments. Memory 1610 may in some embodiments also include a data store configured to store image data for one or more input images and/or output images, in various embodiments. Other information not described herein may be included in memory 1610 and may be used to implement the methods described herein and/or other functionality of computer system 1600.

Network interface 1650 may be configured to enable computer system 1600 to communicate with other computers, systems or machines, such as across a network. Network interface 1650 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1600 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over such a network by network interface 1650 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

GPUs, such as GPU 1640 may be implemented in a number of different physical forms. For example, GPU 1640 may take the form of a dedicated graphics card, an integrated graphics solution and/or a hybrid solution. GPU 1640 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 16, memory 1610 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1640 and the rest of the computer system 1600 may travel through a graphics card slot or other interface, such as interconnect 1660 of FIG. 1600.

Computer system 1600 may also include one or more additional I/O interfaces, such as interfaces for one or more user input devices 1670, or such devices may be coupled to computer system 1600 via network interface 1650. For example, computer system 1600 may include interfaces to a keyboard, a mouse or other cursor control device, a joystick, or other user input devices 1670, in various embodiments. Additionally, the computer system 1600 may include one or more displays (not shown), coupled to processors 1630 and/or other components via interconnect 1660 or network interface 1650. Such input/output devices may be configured to allow a user to interact with graphics application 1620 to request various resizing operations and/or to specify various parameters, thresholds, and/or other configurable options available to the user when editing images executing graphic application 1620. It will be apparent to those having ordinary skill in the art that computer system 1600 may also include numerous other elements not shown in FIG. 16.

Note that program instructions 1615 may be configured to implement a graphic application 1620 as a stand-alone application, or as a module of another graphics application or graphics library, in various embodiments. For example, in one embodiment program instructions 1615 may be configured to implement graphics applications such as painting, publishing, photography, games, animation, and/or other applications, and may be configured to resize images as part of one or more of these graphics applications. In another embodiment, program instructions 1615 may be configured to implement the resizing techniques described herein in one or more functions called by another graphics application executed on GPU 1640 and/or processor(s) 1630. Program instructions 1615 may also be configured to render images and present them on one or more displays as the output of a resizing operation and/or to store image data for resized images in memory 1610 and/or an external storage device(s), in various embodiments. For example, a graphics application 1620 included in program instructions 1615 may utilize GPU 1640 when resizing, rendering, or displaying images in some embodiments.

While various resizing techniques have been described herein with reference to various embodiments, it will be understood that these embodiments are illustrative and are not meant to be limiting. Many variations, modifications, additions, and improvements are possible. More generally, various techniques are described in the context of particular embodiments. For example, the blocks and logic units identified in the description are for ease of understanding and are not meant to be limiting to any particular embodiment. Functionality may be separated or combined in blocks differently in various realizations or described with different terminology. In various embodiments, actions or functions described herein may be performed in a different order than illustrated or described. Any of the operations described may be performed programmatically (i.e., by a computer according to a computer program). Any of the operations described may be performed automatically (i.e., without user intervention).

The embodiments described herein are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope as defined in the claims that follow.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A system, comprising:
   one or more processors; and
   a memory coupled to the one or more processors and storing program instructions executable by the one or more processors to implement:
   accessing data representing an image;
   determining a frequency of one or more pixel values of the image;
   determining a respective energy value for each pixel of the image dependent, at least in part, on said determining a frequency of the one or more pixel values, wherein the energy values indicate the importance of each pixel with respect to resizing operations;
   identifying a seam of the image having a lowest cost, wherein the cost of the seam is dependent on the respective energy values of pixels of the seam; and
   performing a resizing operation on the image along the identified seam to produce a resized version of the image.

2. The system of claim 1, wherein the program instructions are further executable to implement repeating said identifying and said performing for a next lowest cost seam until the resized version of the image meets a specified target size or a specified target aspect ratio.

3. The system of claim 1,
   wherein the resizing operation comprises a reduction operation; and
   wherein said performing comprises removing the pixels of the seam.

4. The system of claim 1,
   wherein the resizing operation comprises an expansion operation; and
   wherein said performing comprises replicating the pixels of the seam and inserting the replicated pixels into the image.

5. The system of claim 1, wherein the cost of the seam is dependent on one or more of: a sum of the respective energy values of all pixels of the seam, an average of the respective energy values of all pixels of the seam, a weighted average of the respective energy values of all pixels of the seam, or a maximum value of the respective energy values of all pixels of the seam.

6. The system of claim 1, wherein said identifying a seam of the image having a lowest cost comprises identifying a shortest path across the image.

7. The system of claim 1, wherein said identifying a seam of the image having a lowest cost comprises applying a dynamic programming technique.

8. The system of claim 1, wherein said determining a frequency of one or more pixel values of the image comprises determining a number of pixels having an absolute pixel value in each of a plurality of pixel value ranges.

9. The system of claim 8, wherein the program instructions are further executable to implement configuring the absolute pixel values that are to be included in each of the plurality of pixel value ranges.

10. The system of claim 9, wherein said configuring is dependent on user input.

11. The system of claim 1, wherein the respective energy values of each of the pixels of the image vary inversely with the determined frequency of the one or more pixel values.

12. The system of claim 1, wherein said determining a respective energy value is further dependent on one or more of: a difference between two or more pixel values, a derivative of two or more pixel values, an average of two or more pixel values, a maximum of two or more pixel values, or a minimum of two or more pixel values.

13. The system of claim 1, wherein each of the pixel values represents one or more of: an absolute color value or an absolute intensity value.

14. The system of claim 1, wherein the one or more processors comprise at least one of: a general-purpose central processing unit (CPU), or a graphics processing unit (GPU).

15. A non-transitory computer-readable storage medium, storing program instructions computer-executable to implement:
- accessing data representing an image;
- determining a frequency of one or more pixel values of the image;
- determining a respective energy value for each pixel of the image dependent, at least in part, on said determining a frequency of the one or more pixel values, wherein the energy values indicate the importance of each pixel with respect to resizing operations;
- identifying a seam of the image having a lowest cost, wherein the cost of the seam is dependent on the respective energy values of pixels of the seam; and
- performing a resizing operation on the image along the identified seam to produce a resized version of the image.

16. The storage medium of claim 15, wherein the program instructions are further executable to implement repeating said identifying and said performing for a next lowest cost seam until the resized version of the image meets a specified target size or a specified target aspect ratio.

17. The storage medium of claim 15,
- wherein the resizing operation comprises a reduction operation; and
- wherein said performing comprises removing the pixels of the seam.

18. The storage medium of claim 15,
- wherein the resizing operation comprises an expansion operation; and
- wherein said performing comprises replicating the pixels of the seam and inserting the replicated pixels into the image.

19. The storage medium of claim 15, wherein the cost of the seam is dependent on one or more of: a sum of the respective energy values of all pixels of the seam, an average of the respective energy values of all pixels of the seam, a weighted average of the respective energy values of all pixels of the seam, or a maximum value of the respective energy values of all pixels of the seam.

20. The storage medium of claim 15, wherein said identifying a seam of the image having a lowest cost comprises one or more of: identifying a shortest path across the image or applying a dynamic programming technique.

21. The storage medium of claim 15, wherein said determining a frequency of one or more pixel values of the image comprises determining a number of pixels having an absolute pixel value in each of a plurality of pixel value ranges.

22. The storage medium of claim 21, wherein the program instructions are further executable to implement configuring the absolute pixel values that are to be included in each of the plurality of pixel value ranges.

23. The storage medium of claim 15, wherein the respective energy values of each of the pixels of the image vary inversely with the determined frequency of the one or more pixel values.

24. The storage medium of claim 15, wherein said determining a respective energy value is further dependent on one or more of: a difference between two or more pixel values, a derivative of two or more pixel values, an average of two or more pixel values, a maximum of two or more pixel values, or a minimum of two or more pixel values.

25. The storage medium of claim 15, wherein each of the pixel values represents one or more of: an absolute color value or an absolute intensity value.

26. A computer-implemented method, comprising:
- accessing data representing an image;
- determining a frequency of one or more pixel values of the image;
- determining a respective energy value for each pixel of the image dependent, at least in part, on said determining a frequency of the one or more pixel values, wherein the energy values indicate the importance of each pixel with respect to resizing operations;
- identifying a seam of the image having a lowest cost, wherein the cost of the seam is dependent on the respective energy values of pixels of the seam; and
- performing a resizing operation on the image along the identified seam to produce a resized version of the image.

27. The method of claim 26, further comprising repeating said identifying and said performing for a next lowest cost seam until the resized version of the image meets a specified target size or a specified target aspect ratio.

28. The method of claim 26,
- wherein the resizing operation comprises a reduction operation; and
- wherein said performing comprises removing the pixels of the seam.

29. The method of claim 26,
- wherein the resizing operation comprises an expansion operation; and
- wherein said performing comprises replicating the pixels of the seam and inserting the replicated pixels into the image.

30. The method of claim 26, wherein the cost of the seam is dependent on one or more of: a sum of the respective energy values of all pixels of the seam, an average of the respective energy values of all pixels of the seam, a weighted average of the respective energy values of all pixels of the seam, or a maximum value of the respective energy values of all pixels of the seam.

31. The method of claim 26, wherein said identifying a seam of the image having a lowest cost comprises one or more of: identifying a shortest path across the image or applying a dynamic programming technique.

32. The method of claim 26, wherein said determining a frequency of one or more pixel values of the image comprises determining a number of pixels having an absolute pixel value in each of a plurality of pixel value ranges.

33. The method of claim 32, further comprising determining the absolute pixel values to be included in each of the plurality of pixel value ranges dependent on user input.

34. The method of claim 26, wherein the respective energy values of each of the pixels of the image vary inversely with the determined frequency of the one or more pixel values.

35. The method of claim 26, wherein said determining a respective energy value is further dependent on one or more of: a difference between two or more pixel values, a derivative of two or more pixel values, an average of two or more pixel values, a maximum of two or more pixel values, or a minimum of two or more pixel values.

36. The method of claim 26, wherein each of the pixel values represents one or more of: an absolute color value or an absolute intensity value.

* * * * *